United States Patent
Zhu et al.

(10) Patent No.: US 10,530,595 B2
(45) Date of Patent: Jan. 7, 2020

(54) SMALL AREA MBSFN ENHANCEMENT

(71) Applicants: Xipeng Zhu, Beijing (CN); Jun Wang, Poway, CA (US); Xiaoxia Zhang, San Diego, CA (US); Gang Bao, San Diego, CA (US); QUALCOMM Incorporated, San Diego, CA (US)

(72) Inventors: Xipeng Zhu, Beijing (CN); Jun Wang, Poway, CA (US); Xiaoxia Zhang, San Diego, CA (US); Gang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 15/100,932

(22) PCT Filed: Jan. 2, 2015

(86) PCT No.: PCT/CN2015/070009
§ 371 (c)(1),
(2) Date: Jun. 1, 2016

(87) PCT Pub. No.: WO2015/103947
PCT Pub. Date: Jul. 16, 2015

(65) Prior Publication Data
US 2016/0308684 A1    Oct. 20, 2016

(30) Foreign Application Priority Data
Jan. 8, 2014 (WO) ................ PCT/CN2014/070310

(51) Int. Cl.
*H04L 12/18* (2006.01)
*H04W 4/06* (2009.01)
(Continued)

(52) U.S. Cl.
CPC ........... *H04L 12/189* (2013.01); *H04W 4/021* (2013.01); *H04W 4/06* (2013.01); *H04W 36/26* (2013.01);
(Continued)

(58) Field of Classification Search
CPC ..... H04W 4/06; H04W 72/00; H04W 72/005; H04W 36/26; H04W 40/023;
(Continued)

(56) References Cited

U.S. PATENT DOCUMENTS 9,826,502 B2 * 11/2017 Cherian .............. H04W 72/005
2009/0286468 A1   11/2009 Kim et al.
(Continued)

FOREIGN PATENT DOCUMENTS

CN          101370239 A      2/2009
CN          101395831 A      3/2009
(Continued)

OTHER PUBLICATIONS

Anonymous: "Hybrid Automatic Repeat Request—Wikipedia", Jan. 1, 2014, XP055377275, pp. 1-4, Retrieved from the Internet: URL:https://en.wikipedia.org/w/index.php?title=Hybrid_automatic_repeat_request&oldid =588684381 [retrieved on May 30, 2017].
(Continued)

*Primary Examiner* — Warner Wong
(74) *Attorney, Agent, or Firm* — Anthony R. Morris

(57) ABSTRACT

A method, an apparatus, and a computer program product for wireless communication are provided. The apparatus may be a UE. The UE determines whether the UE is located within a sub-region of an MBSFN area based on one or more parameters. The UE receives based on the determination a service over broadcast in the sub-region of the MBSFN area or over unicast outside the sub-region. In an aspect, the MBSFN area may be smaller than a unicast area. In an
(Continued)

aspect, adaptive retransmission with a group NACK approach may be used to improve an SNR and reliability.

32 Claims, 25 Drawing Sheets

(51) Int. Cl.
*H04W 72/00* (2009.01)
*H04W 36/26* (2009.01)
*H04W 4/021* (2018.01)
*H04W 76/40* (2018.01)

(52) U.S. Cl.
CPC ......... *H04W 72/005* (2013.01); *H04W 76/40* (2018.02)

(58) Field of Classification Search
CPC . H04W 49/021; H04W 48/00; H04W 76/002; H04L 12/18
See application file for complete search history.

(56) References Cited

U.S. PATENT DOCUMENTS

| | | | | |
|---|---|---|---|---|
| 2009/0316615 A1* | 12/2009 | Vedantham | ....... | H04W 36/0007 370/312 |
| 2010/0278093 A1 | 11/2010 | Wang et al. | | |
| 2012/0014264 A1* | 1/2012 | Wang | .................. | H04W 36/08 370/252 |
| 2012/0093060 A1* | 4/2012 | Huschke | ............... | H04W 48/12 370/312 |
| 2012/0314641 A1* | 12/2012 | Kotecha | .................. | H04H 20/42 370/312 |
| 2013/0028118 A1 | 1/2013 | Cherian et al. | | |
| 2013/0039251 A1* | 2/2013 | Wilkinson | ........ | H04W 36/0007 370/312 |
| 2013/0225180 A1* | 8/2013 | Lim | .................... | H04W 36/165 455/440 |
| 2013/0258935 A1 | 10/2013 | Zhang et al. | | |
| 2013/0294321 A1* | 11/2013 | Wang | ....................... | H04W 4/06 370/312 |
| 2014/0161020 A1* | 6/2014 | Jung | .................... | H04W 36/026 370/312 |
| 2014/0177437 A1* | 6/2014 | Korus | .................... | H04W 76/00 370/230 |
| 2014/0177504 A1* | 6/2014 | Sayeed | ............... | H04W 72/005 370/312 |
| 2015/0026735 A1* | 1/2015 | Fernandes | ........ | H04N 21/44004 725/62 |
| 2015/0078241 A1* | 3/2015 | Xu | ........................ | H04L 12/189 370/312 |
| 2015/0109987 A1* | 4/2015 | Wang | .................... | H04W 12/08 370/312 |
| 2015/0124686 A1* | 5/2015 | Zhang | .................... | H04L 12/189 370/312 |
| 2015/0327299 A1* | 11/2015 | Koskinen | ................ | H04W 4/06 370/329 |
| 2016/0316398 A1* | 10/2016 | Han | .................. | H04W 36/0055 |
| 2016/0323719 A1* | 11/2016 | Wang | ....................... | H04W 4/08 |
| 2017/0207924 A1* | 7/2017 | Lee | ....................... | H04L 12/189 |
| 2017/0237534 A1* | 8/2017 | Seki | ...................... | H04L 5/0032 370/312 |

FOREIGN PATENT DOCUMENTS

| | | | | |
|---|---|---|---|---|
| CN | 101821960 A | | 9/2010 | |
| CN | 102084670 A | | 6/2011 | |
| CN | 102448019 A | | 5/2012 | |
| CN | 102523559 A | | 6/2012 | |
| EP | 2365713 | * | 7/2010 | ............ H04W 36/32 |
| JP | 2015522224 A | | 8/2015 | |
| WO | 2013016442 A1 | | 1/2013 | |
| WO | 2014004787 A1 | | 1/2014 | |

OTHER PUBLICATIONS

Supplementary European Search Report—EP15734917—Search Authority—Munich—dated Jun. 14, 2017.
International Search Report and Written Opinion—PCT/CN2014/070310—ISA/EPO—dated Oct. 9, 2014.
International Search Report and Written Opinion—PCT/CN2015/070009—ISA/EPO—dated Mar. 27, 2015.

* cited by examiner

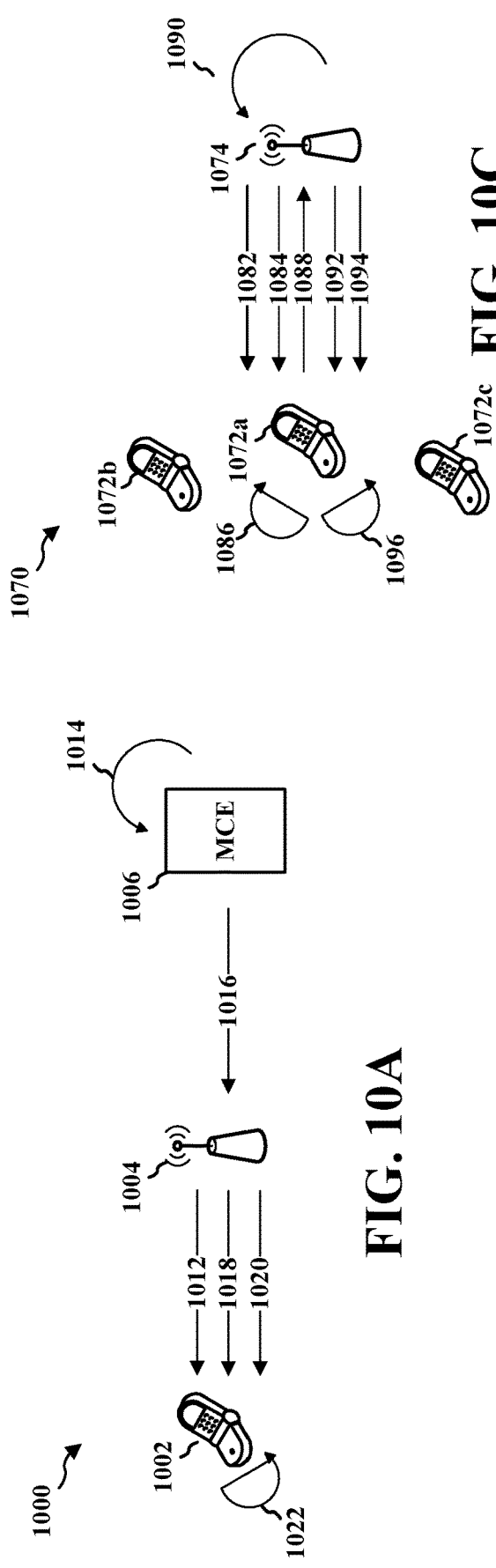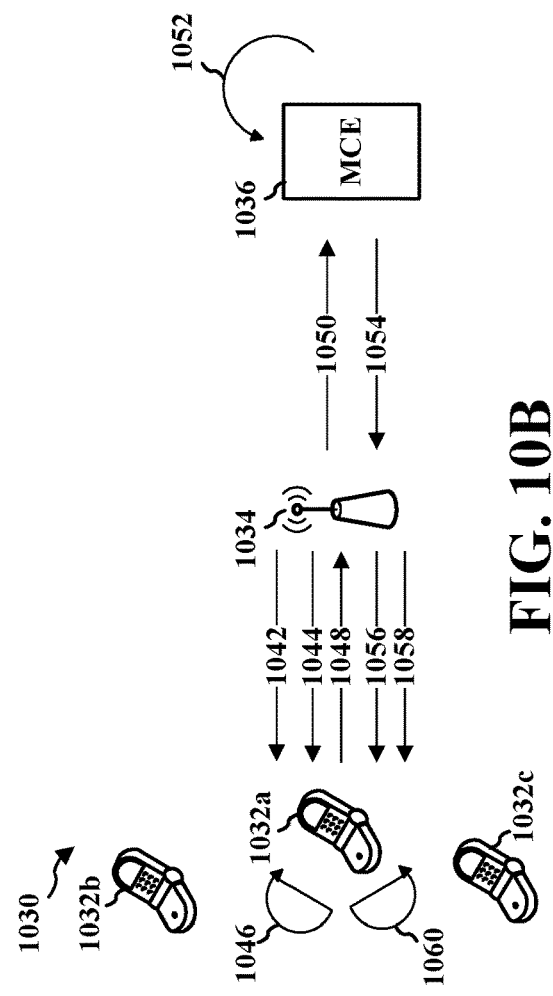
FIG. 10A  FIG. 10B  FIG. 10C

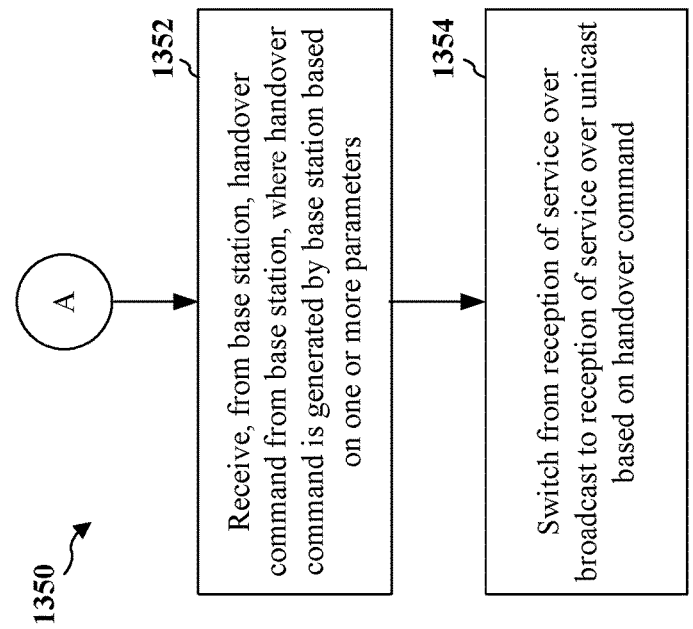
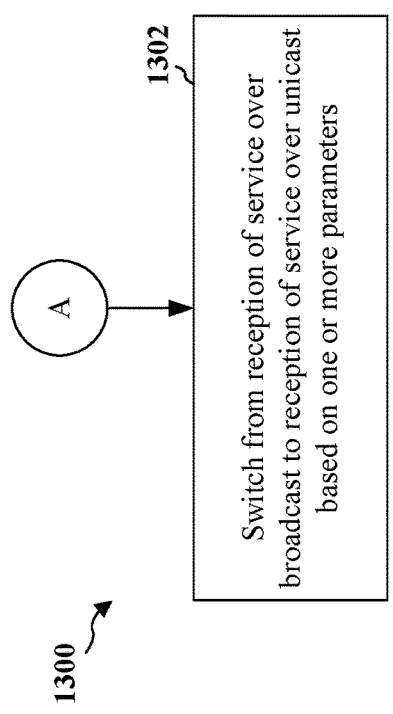

SMALL AREA MBSFN ENHANCEMENT

CROSS-REFERENCE TO RELATED APPLICATION(S)

This application is a national stage entry of PCT Application Serial No. PCT/CN2015/070009, entitled "SMALL MBSFN ENHANCEMENT" and filed on Jan. 2, 2015, which claims priority to PCT Application Serial No. PCT/CN2014/070310, entitled "SMALL MBSFN ENHANCEMENT" and filed on Jan. 8, 2014, each of which are expressly incorporated by reference herein in their entirety.

BACKGROUND

Field

The present disclosure relates generally to communication systems, and more particularly, to a Multicast Broadcast Single Frequency Network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. As used herein, DL communications may be communications from a network entity (e.g., evolved Node B (eNodeB)) to a user equipment (UE). Further, as used herein, UL communications may be communications from a UE to a network entity. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a UE. The apparatus determines whether the apparatus is located within a sub-region of a multicast broadcast single-frequency network (MBSFN) area based on one or more parameters. The apparatus receives, based on the determination, a service over broadcast when the UE is within the sub-region of the MBSFN area or over unicast when the UE is not within the sub-region. In an aspect, the MBSFN area is smaller than a unicast area.

In another aspect, the apparatus may be a UE. The apparatus includes means for determining whether the UE is located within a sub-region of an MBSFN area based on one or more parameters. The apparatus includes means for receiving based on the determination a service over broadcast when the UE is within the sub-region of the MBSFN area or over unicast when the UE is not within the sub-region. In an aspect, the MBSFN area is smaller than a unicast area.

In another aspect, the apparatus may be a UE. The apparatus includes a memory and at least one processor coupled to the memory. The at least one processor is configured to determine whether the apparatus is located within a sub-region of an MBSFN area based on one or more parameters, and to receive based on the determination a service over broadcast when the UE is within the sub-region of the MBSFN area or over unicast when the UE is not within the sub-region. In an aspect, the MBSFN area is smaller than a unicast area.

In another aspect, a computer program product may be provided for a UE. The computer program product includes a computer-readable medium including code for determining whether the UE is located within a sub-region of an MBSFN area based on one or more parameters, and receiving based on the determination a service over broadcast when the UE is within the sub-region of the MBSFN area or over unicast when the UE is not within the sub-region. In an aspect, the MBSFN area is smaller than a unicast area.

In another aspect of the disclosure, a method, a computer program product, and an apparatus are provided. The apparatus may be a base station. The apparatus provides a service over broadcast to a UE in a sub-region of an MBSFN area. The apparatus sends a signal associated with one or more parameters to the UE, the signal causing the UE to switch from reception of the service over broadcast to reception of the service over unicast. In an aspect, the MBSFN area is smaller than a unicast area.

In another aspect, the apparatus may be a base station. The apparatus includes means for providing a service over broadcast to a UE in a sub-region of an MBSFN area. The apparatus includes means for sending a signal associated with one or more parameters to the UE, the signal causing the UE to switch from reception of the service over broadcast to reception of the service over unicast. In an aspect, the MBSFN area is smaller than a unicast area.

In another aspect, the apparatus may be a base station. The apparatus includes a memory and at least one processor coupled to the memory. The at least one processor is configured to provide a service over broadcast to a UE in a sub-region of an MBSFN area, and to send a signal associated with one or more parameters to the UE, the signal causing the UE to switch from reception of the service over broadcast to reception the service over unicast. In an aspect, the MBSFN area is smaller than a unicast area.

In another aspect, a computer program product may be provided for a base station. The computer program product includes a computer-readable medium including code for providing a service over broadcast to a UE in a sub-region of an MBSFN area, and sending a signal associated with one or more parameters to the UE, the signal causing the UE to switch from reception of the service over broadcast to reception of the service over unicast. In an aspect, the MBSFN area is smaller than a unicast area.

In another aspect of the disclosure, a method, a computer program product, and an apparatus are provided. The apparatus may be a base station. The apparatus may provide a service over unicast to a UE. The apparatus may send a signal associated with one or more parameters to the UE, the signal causing the UE to switch from reception of the service over unicast to reception of the service over broadcast in a sub-region of an MBSFN area. In an aspect, the MBSFN area is smaller than a unicast area.

In another aspect, the apparatus may be a base station. The apparatus includes means for providing a service over unicast to a UE. The apparatus includes means for sending a signal associated with one or more parameters to the UE, the signal causing the UE to switch from reception of the service over unicast to reception the service over broadcast in a sub-region of an MBSFN area. In an aspect, the MBSFN area is smaller than a unicast area.

In another aspect, the apparatus may be a base station. The apparatus includes a memory and at least one processor coupled to the memory. The at least one processor is configured to provide a service over unicast to a UE, and to send a signal associated with one or more parameters to the UE, the signal causing the UE to switch from reception of the service over unicast to reception of the service over broadcast in a sub-region of an MBSFN area. In an aspect, the MBSFN area is smaller than a unicast area.

In another aspect, a computer program product may be provided for a base station. The computer program product includes a computer-readable medium including code for providing a service over unicast to a UE, and sending a signal associated with one or more parameters to the UE, the signal causing the UE to switch from reception of the service over unicast to reception of the service over broadcast in a sub-region of an MBSFN area. In an aspect, the MBSFN area is smaller than a unicast area.

In another aspect of the disclosure, a method, a computer program product, and an apparatus are provided. The apparatus may be a UE. The apparatus receives, from a base station, a retransmission indicator. The apparatus receives, from the base station, a broadcast retransmission of a signal corresponding to the retransmission indicator upon reception of the retransmission indicator. The apparatus combines the broadcast retransmission of the signal and an initial transmission of the signal previously received by the apparatus to decode the signal.

In another aspect, the apparatus may be a UE. The apparatus includes means for receiving, from a base station, a retransmission indicator. The apparatus includes means for receiving, from the base station, a broadcast retransmission of a signal corresponding to the retransmission indicator upon reception of the retransmission indicator. The apparatus includes means for combining the broadcast retransmission of the signal and an initial transmission of the signal previously received by the apparatus to decode the signal.

In another aspect, the apparatus may be a UE. The apparatus includes a memory and at least one processor coupled to the memory. The at least one processor is configured to receive, from a base station, a retransmission indicator, to receive, from the base station, a broadcast retransmission of a signal corresponding to the retransmission indicator upon reception of the retransmission indicator, and to combine the broadcast retransmission of the signal and an initial transmission of the signal previously received by the apparatus to decode the signal.

In another aspect, a computer program product may be provided for a UE. The computer program product includes a computer-readable medium including code for receiving, from a base station, a retransmission indicator, receiving from the base station a broadcast retransmission of a signal corresponding to the retransmission indicator upon reception of the retransmission indicator, and combining the broadcast retransmission of the signal and an initial transmission of the signal previously received by the UE to decode the signal.

In another aspect of the disclosure, a method, a computer program product, and an apparatus are provided. The apparatus may be a base station. The apparatus sends an initial transmission of a signal to a UE. The apparatus sends a retransmission indicator to the UE. The apparatus sends a broadcast retransmission of the signal corresponding to the retransmission indicator to the UE after sending the retransmission indicator to facilitate decoding of the signal based on a combination of the broadcast retransmission of the signal and the initial transmission of the signal.

In another aspect, the apparatus may be a base station. The apparatus includes means for sending an initial transmission of a signal to a UE. The apparatus includes means for sending a retransmission indicator to the UE. The apparatus includes means for sending a broadcast retransmission of the signal corresponding to the retransmission indicator to the UE after sending the retransmission indicator to facilitate decoding of the signal based on a combination of the broadcast retransmission of the signal and the initial transmission of the signal.

In another aspect, the apparatus may be a base station. The apparatus includes a memory and at least one processor coupled to the memory. The at least one processor is configured to send an initial transmission of a signal to a UE, to send a retransmission indicator to the UE, and to send a broadcast retransmission of the signal corresponding to the retransmission indicator to the UE after sending the retransmission indicator to facilitate decoding of the signal based on a combination of the broadcast retransmission of the signal and the initial transmission of the signal.

In another aspect, a computer program product may be provided for a base station. The computer program product includes a computer-readable medium including code for sending an initial transmission of a signal to a UE, sending a retransmission indicator to the UE, and sending a broadcast retransmission of the signal corresponding to the retransmission indicator to the UE after sending the retransmission indicator to facilitate decoding of the signal based on a combination of the broadcast retransmission of the signal and the initial transmission of the signal.

In another aspect of the disclosure, a method, a computer program product, and an apparatus are provided. The apparatus may be a UE. The apparatus receives a serving cell MBMS signal from a serving cell of the apparatus and a neighbor cell MBMS signal from a neighbor cell. The apparatus determines a degree of synchronization between the serving cell MBMS signal and the neighbor cell MBMS signal. The apparatus combines the serving cell MBMS signal and the neighbor cell MBMS signal based on the degree of synchronization.

In another aspect, the apparatus may be a UE. The apparatus includes means for receiving a serving cell MBMS signal from a serving cell of the apparatus and a neighbor cell MBMS signal from a neighbor cell. The apparatus includes means for determining a degree of synchronization between the serving cell MBMS signal and the neighbor cell MBMS signal. The apparatus includes means for combining the serving cell MBMS signal and the neighbor cell MBMS signal based on the degree of synchronization.

In another aspect, the apparatus may be a UE. The apparatus includes a memory and at least one processor coupled to the memory. The at least one processor is configured to receive a serving cell MBMS signal from a serving cell of the apparatus and a neighbor cell MBMS signal from a neighbor cell, to determine a degree of synchronization between the serving cell MBMS signal and the neighbor cell MBMS signal, and to combine the serving cell MBMS signal and the neighbor cell MBMS signal based on the degree of synchronization.

In another aspect, a computer program product may be provided for a UE. The computer program product includes a computer-readable medium including code for receiving a serving cell MBMS signal from a serving cell of the UE and a neighbor cell MBMS signal from at least one neighbor cell, determining a degree of synchronization between the serving cell MBMS signal and the neighbor cell MBMS signal, and combining the serving cell MBMS signal and the neighbor cell MBMS signal based on the degree of synchronization.

BRIEF DESCRIPTION OF THE DRAWINGS

FIG. 10A is an example diagram illustrating the first solution of the second approach.

FIG. 10B is an example diagram illustrating a first option of the second approach's second solution.

FIG. 10C is an example diagram illustrating a second option of the second approach's second solution.

FIGS. 13A-13C are flow charts of a method of wireless communication expanding from FIG. 12.

DETAILED DESCRIPTION

Figure 1:
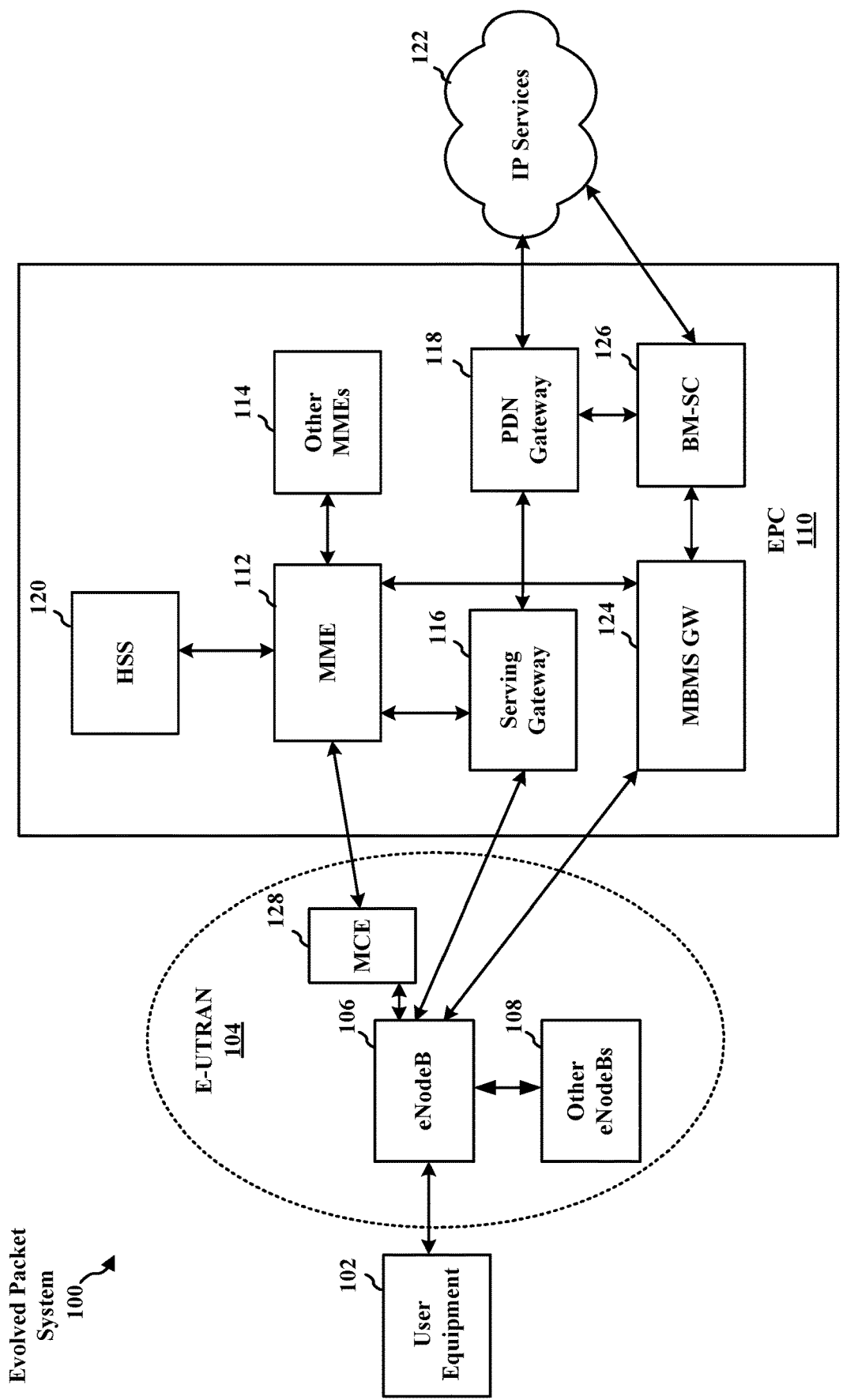
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
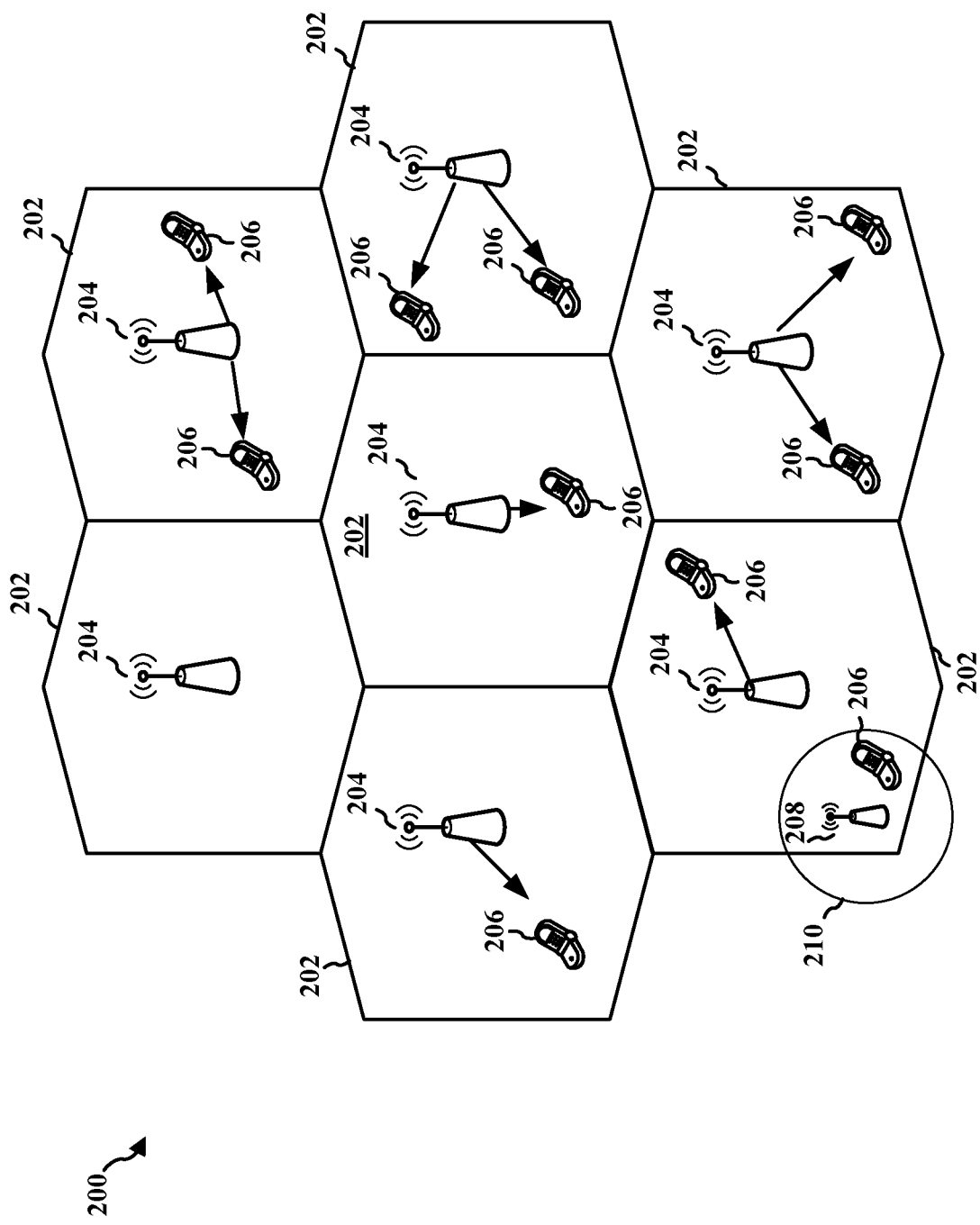
FIG. 2 is a diagram illustrating an example of an access network.

FIG. 2 is a diagram illustrating an example of an access network 200 in an LTE network architecture 100 as shown in FIG. 1. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110, in FIG. 1, for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116 in FIG. 1. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
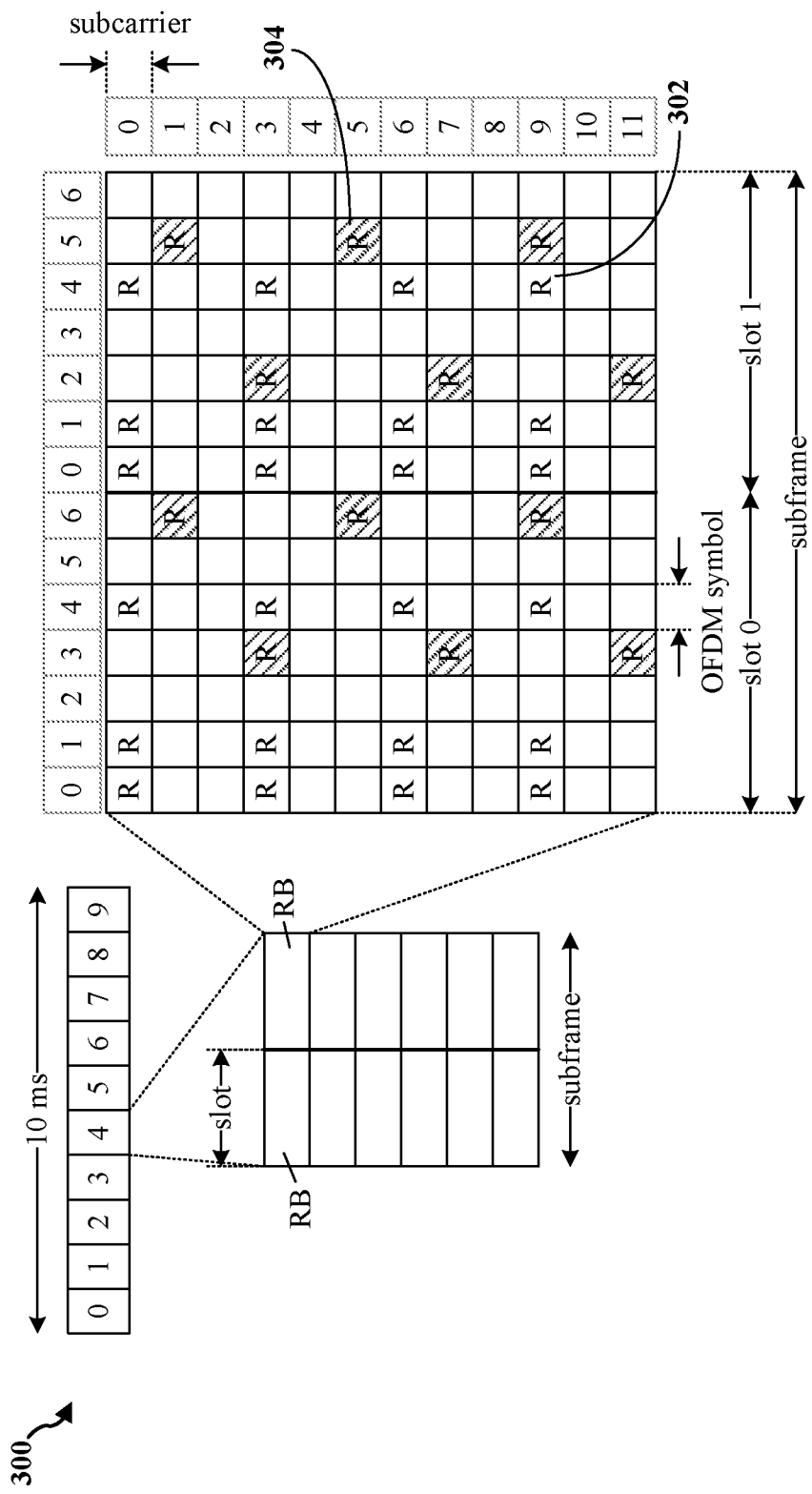
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
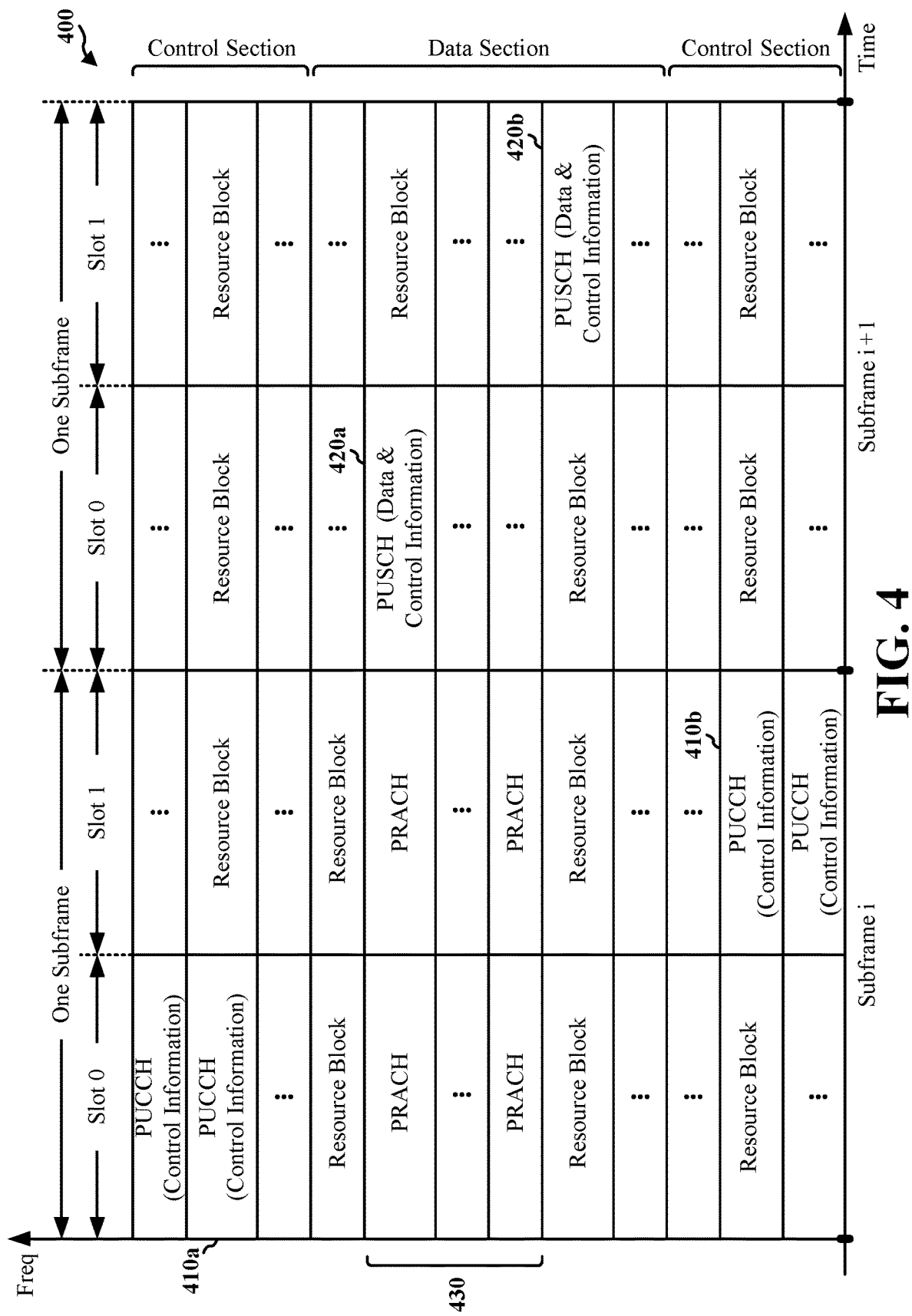
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
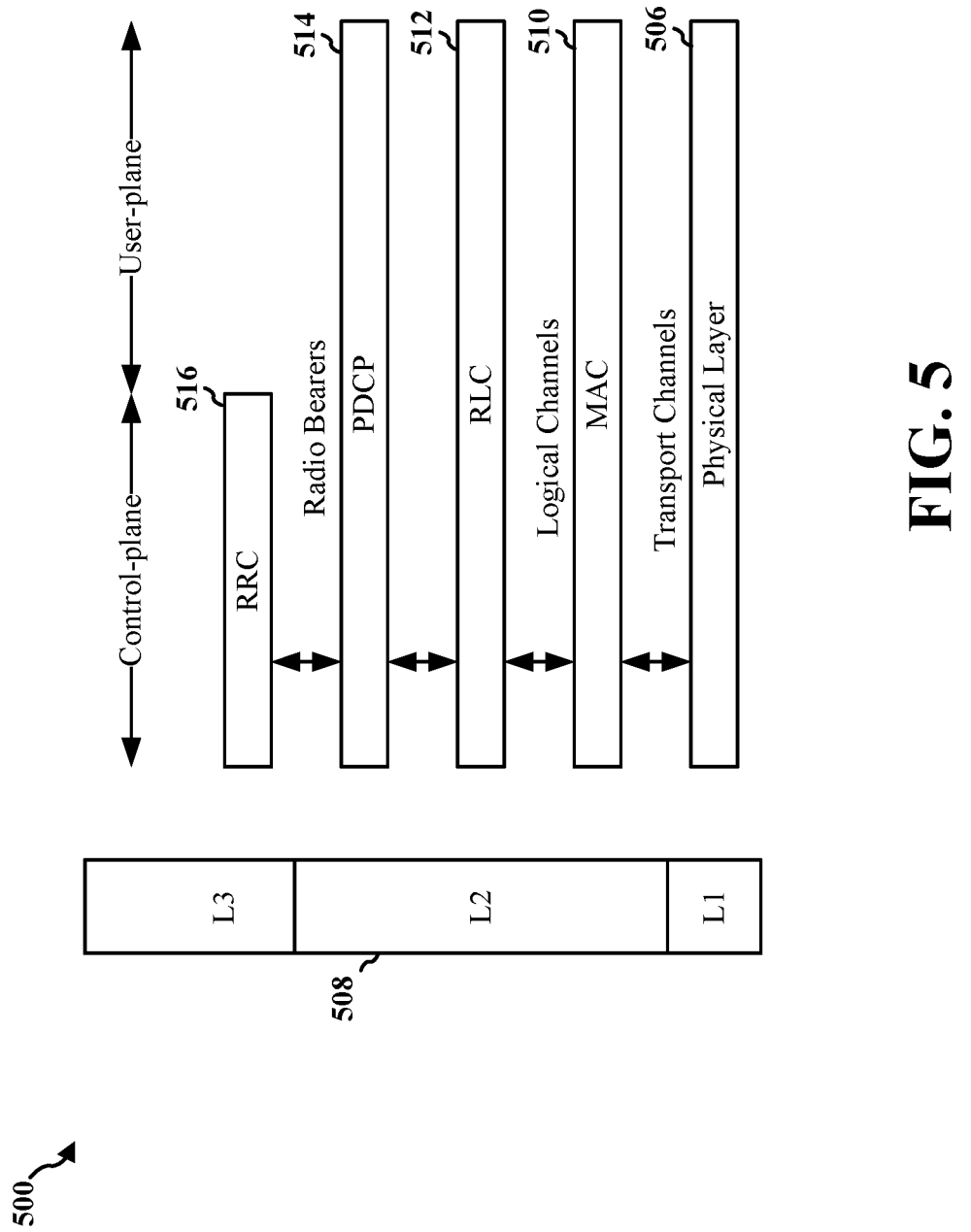
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118, in FIG. 1, on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
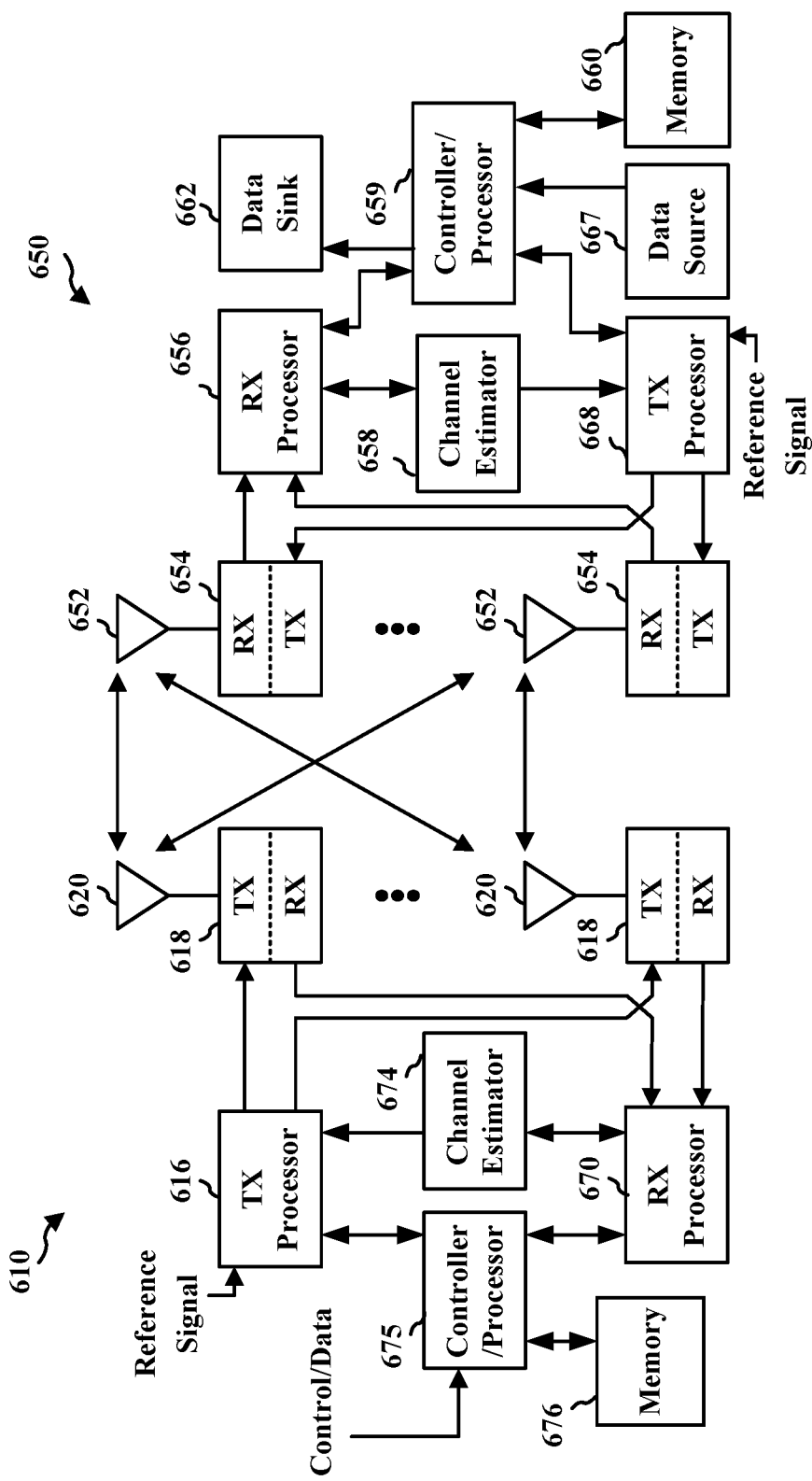
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7B:
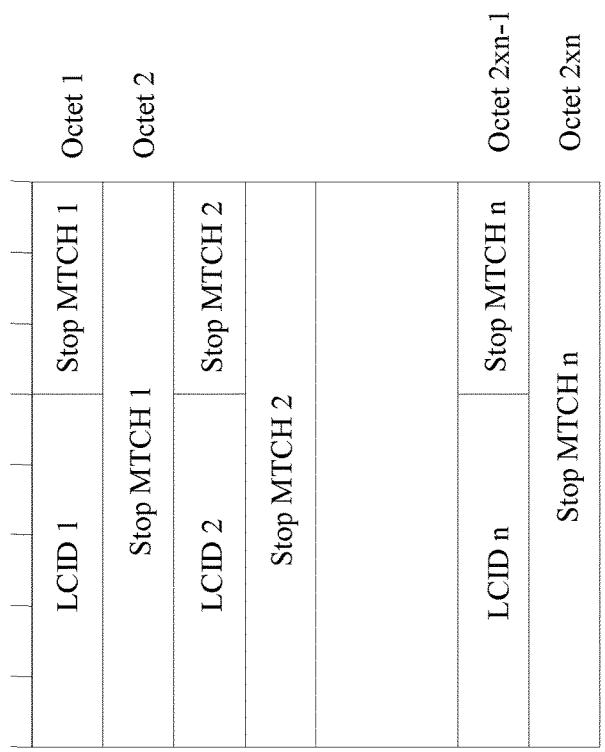
FIG. 7B is a diagram illustrating a format of a Multicast Channel Scheduling Information Media Access Control control element.
Figure 7A:
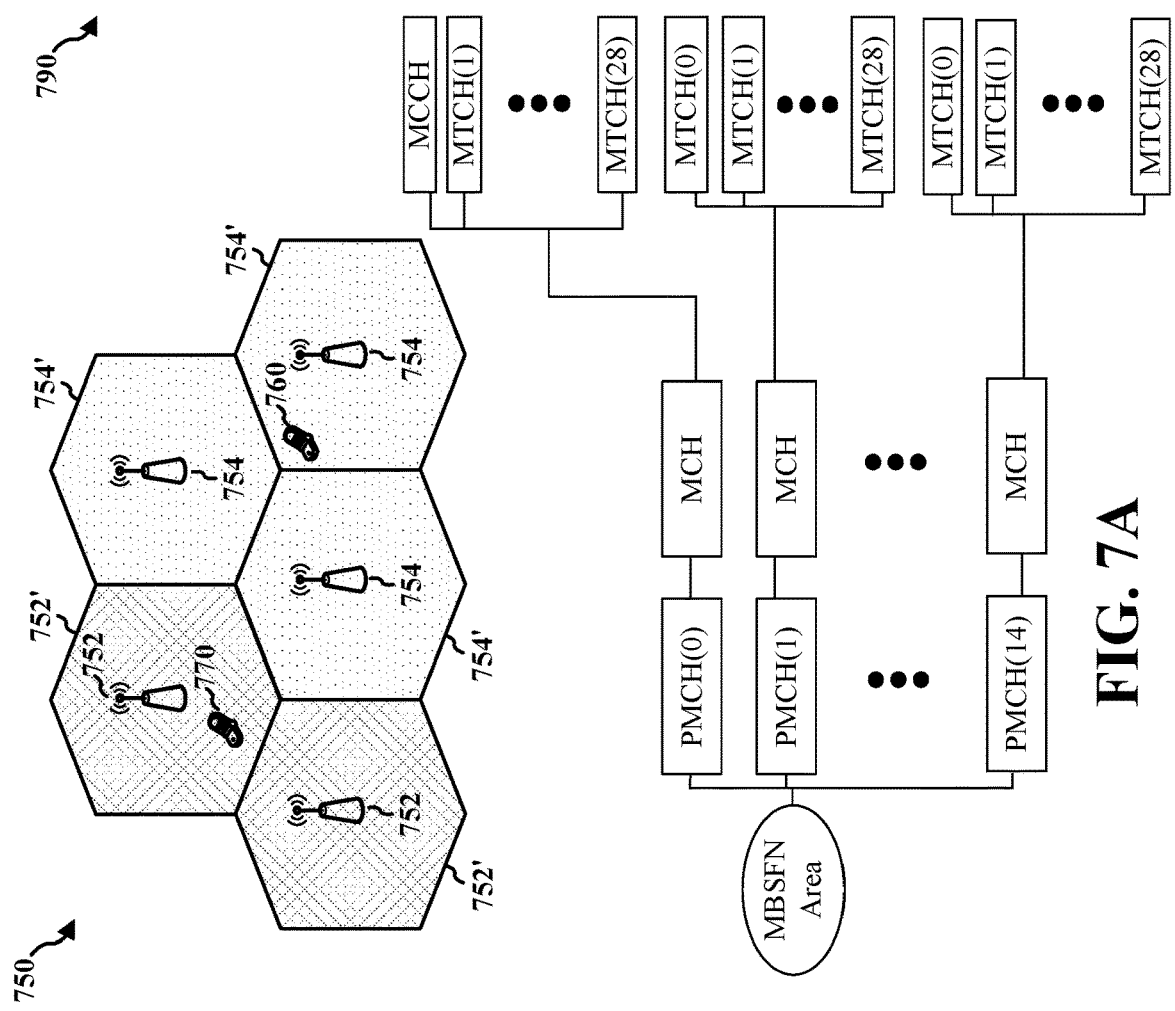
FIG. 7A is a diagram illustrating an example of an evolved Multimedia Broadcast Multicast Service channel configuration in a Multicast Broadcast Single Frequency Network.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13 (SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

eNBs in an MBSFN area may be synchronized to enhance signal transmission when signals from the eNBs in the MBSFN area are combined to provide an enhanced signal, especially in an eMBMS. However, it may be difficult to synchronize eNBs to form an MBSFN area. A small MBSFN such as a single site MBSFN may be utilized as an approach that falls between a large MBSFN and a unicast network. For example, a number of cells in a small MBSFN may be smaller than a number of cells in a surrounding unicast network, and a single site MBSFN may have a single cell for the MBSFN. The small MBSFN may be used for a group call if all the UEs in the group are located within the MBSFN area. A group call is communication from eNBs to the UEs in a group. In such a case, the small MBSFN or the single site MBSFN may not be effective in signal transmission except when the surrounding cells are not transmitting signals.

Figure 8B:
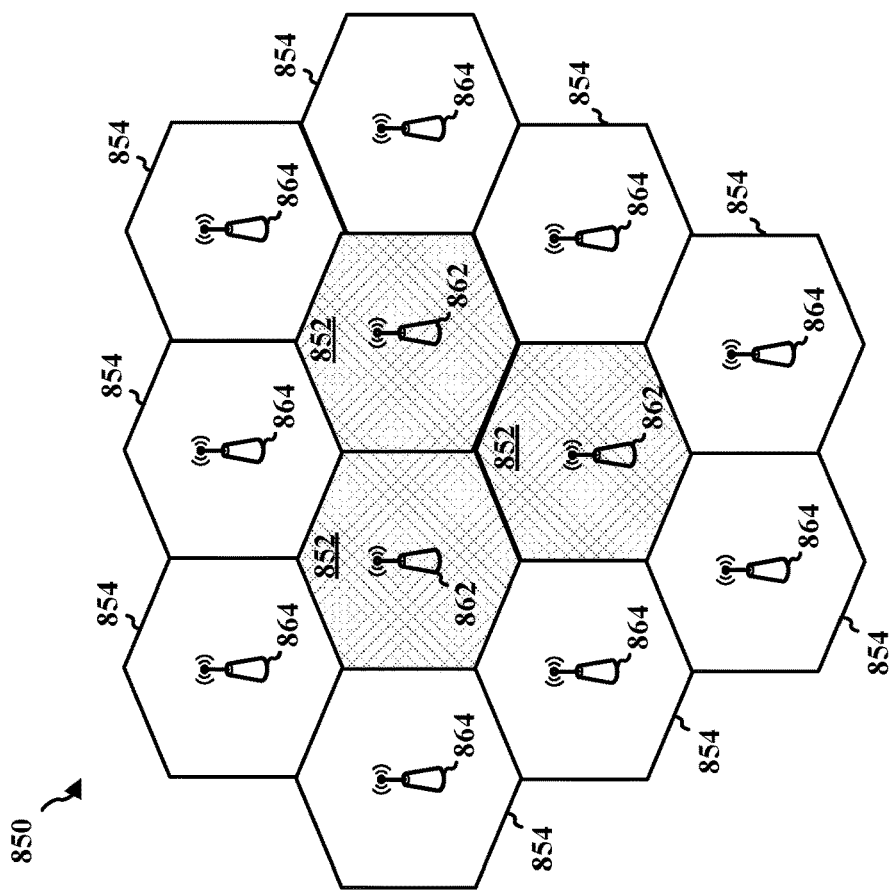
FIG. 8B illustrates an example network having a small MBSFN with multiple MBSFN cells.
Figure 8A:
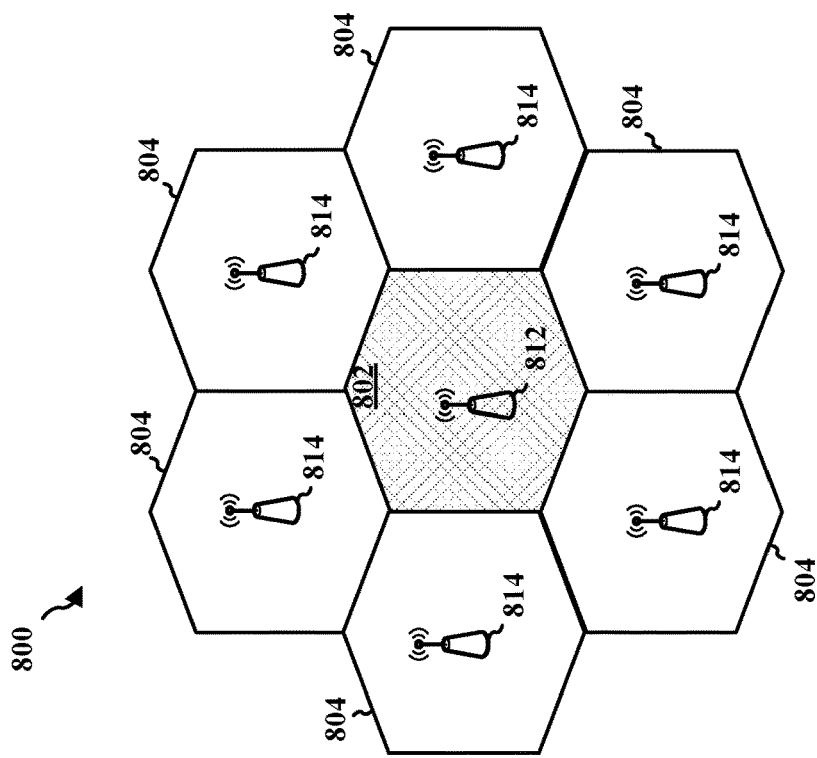
FIG. 8A illustrates an example network having a single site MBSFN with a single MBSFN cell.

FIG. 8A illustrates an example network 800 having a single site MBSFN with a single MBSFN cell. In FIG. 8A, an MBSFN cell 802 forms a small MBSFN area surrounded by non-MBSFN cells (e.g., unicast cells) 804 that form a unicast area. The MBSFN eNB 812 is assigned to the MBSFN cell 802. Each of non-MBSFN eNBs 814 is assigned to a corresponding non-MBSFN cell 804. In an aspect, the MBSFN may include more than one cell (e.g., three MBSFN cells), where a number of the MBSFN cells in the small MBSFN is less than a number of surrounding unicast cells. FIG. 8B illustrates an example network 850 having a small MBSFN with multiple MBSFN cells. In FIG. 8B, MBSFN cells 852 form a small MBSFN area surrounded by non-MBSFN cells (e.g., unicast cells) 854 that form a unicast area. Each of MBSFN eNBs 862 is assigned to a corresponding MBSFN cell 852. Each of non-MBSFN eNBs 864 is assigned to a corresponding non-MBSFN cell 854. In the example shown in FIG. 8B, the number of the MBSFN cells 852 is three and the number of the non-MBSFN cells (e.g., unicast cells) 854 is nine. Thus, the number of MBSFN cells 852 is less than the number of non-MBSFN cells 854.

Figure 9:
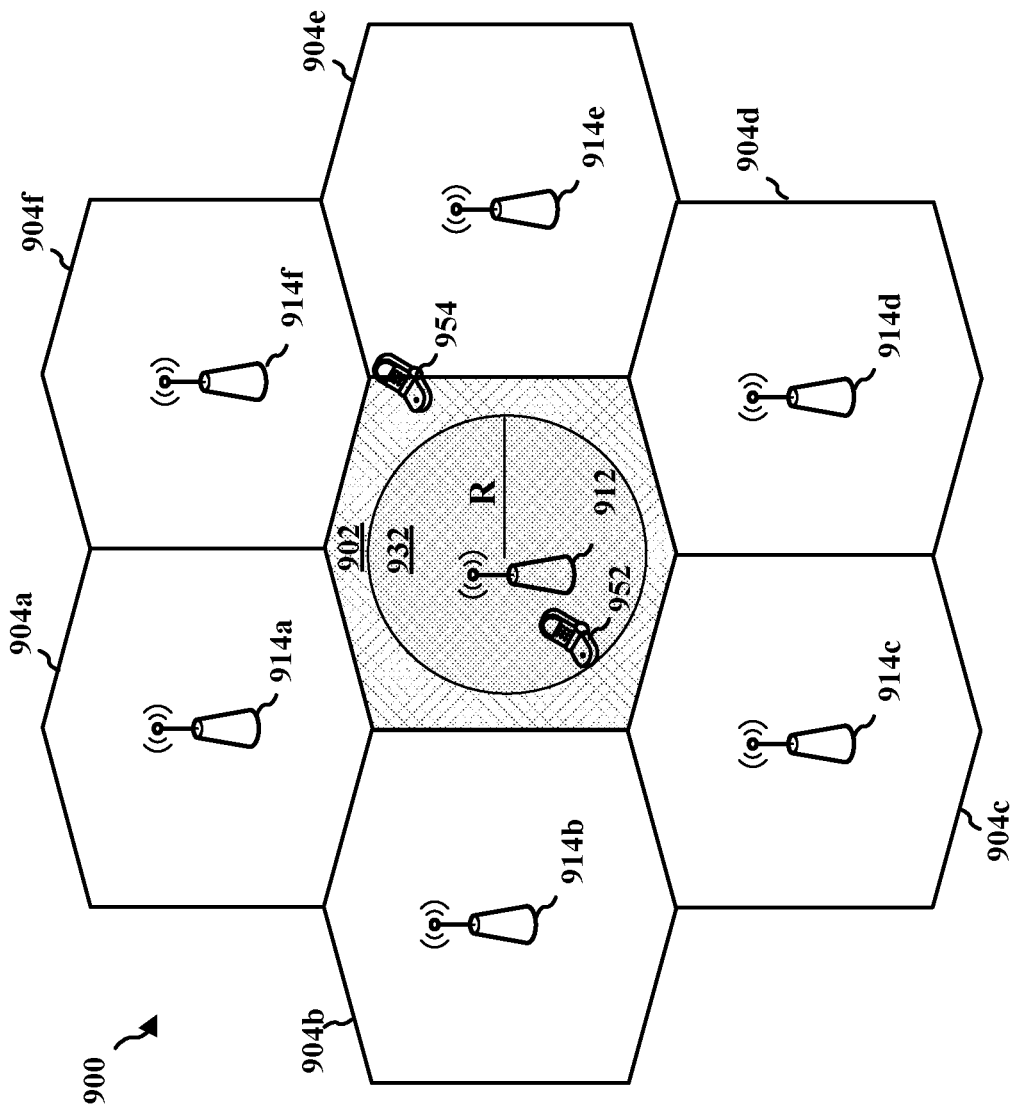
FIG. 9 is an example network having a small MBSFN with reduced eMBMS coverage.

According to a first approach of the disclosure, reduced eMBMS coverage for a small MBSFN is used to improve service in the small MBSFN. In particular, eMBMS coverage for a small MBSFN may be reduced to a sub-region of the small MBSFN, where the sub-region is smaller than an area covered by the MBSFN. The UE receives the service via eMBMS within the sub-region, and receives the service via unicast outside the sub-region. FIG. 9 is an example network 900 having a small MBSFN with reduced eMBMS coverage. For example, the small MBSFN may be defined as an area in which a service may be supported based on a MCS threshold. In FIG. 9, an MBSFN cell 902 forms a small MBSFN area surrounded by non-MBSFN cells (e.g., unicast cells) 904 (904a-904f) that form a unicast area. The eNB 912 is assigned to the MBSFN cell 902, where the eNB 912 may be an MBSFN eNB. eNBs 914a-914f are assigned to non-MBSFN cells 904a-904f, respectively, where the eNBs 914a-914f may be non-MBSFN eNBs. In FIG. 9, the small MBSFN area may provide reduced eMBMS coverage in a sub-region 932 of the MBSFN cell 902. Thus, the sub-region 932 is an MBSFN coverage area that is smaller than the MBSFN area covered by the MBSFN cell 902. If the UE (e.g., a UE 952) is within the sub-region 932, the UE within the sub-region 932 receives the service over broadcast. If the UE (e.g., a UE 954) is outside the sub-region 932, the UE outside the sub-region 932 receives the service over unicast. In the example illustrated in FIG. 9, the sub-region 932 is a circular shape with a radius R. It is noted that the shape of the sub-region is not limited to a circle, and may be any shape. Further, it is noted that the small MBSFN may include more than one MBSFN cell.

There may be at least two service continuity scenarios involving the small MBSFN with reduced eMBMS coverage. In a first scenario, referred to as a broadcast (BC) to unicast (UC) scenario, the UE moves out of a broadcast coverage area (e.g., an eMBMS coverage area), and thus may switch from receiving over BC (e.g., via eMBMS) to receiving over UC. In one example, if the UE cannot receive the service from the MBSFN (e.g., at least in part because many cells in the MBSFN cannot be synchronized), then the UE can switch from BC to the UC to receive the service over unicast. In a second scenario, referred to as a UC to BC scenario, the UE moves into the broadcast coverage area (e.g., eMBMS coverage area) from a unicast coverage area, and thus may switch from receiving over UC to receiving over BC (e.g., via eMBMS).

When the UE moves from the MBSFN coverage area to a non-MBSFN coverage area, the service (e.g., group call) may be switched from BC to UC to ensure service continuity (e.g., to receive the service without interruption). For example, referring to the example of FIG. 9, as the UE moves from the sub-region 932 to an area outside of the sub-region 932, the UE switches from receiving over BC (e.g., via eMBMS) to receiving over UC to receive a service (e.g., a group call) continuously. The switching from BC to UC may be based on one or more parameters, such as signal characteristics associated with the BC service, signal characteristics associated with the UC service, timing advance, a location of the UE, path loss, a parameter of the sub-region of the MBSFN area, and geometry. For example, if the signal characteristics associated with the BC service indicates lower BC signal strength and/or the signal characteristics associated with the UC service indicates higher UC signal strength, the UE may switch from BC to UC.

In particular, the signal characteristic (BC or UC) may be associated with a serving base station and neighboring base stations. For example, the eNB 912 may receive signal characteristics from each of the UEs 952 and 954. The eNB 912 may receive signal characteristics from the UE 952 based on unicast and/or multicast/broadcast transmissions from the eNBs 912, 914*b*, and 914*c*; and from the UE 954 based on unicast and/or multicast/broadcast transmissions from the eNBs 912, 914*e*, and 914*f* Thus, for example, the eNB 912 may receive signal characteristics from a UE based on unicast and/or multicast/broadcast transmissions from one or more eNBs within proximity of the UE. The signal characteristics associated with the BC service may include broadcast reference signal received power (RSRP), broadcast reference signal received quality (RSRQ), and/or a signal-to-interference-plus-noise ratio (SINR). The signal characteristics associated with the UC service may include unicast RSRP, unicast RSRQ, and/or a channel quality indicator (CQI). The geometry may include information indicating received signal power from the MBSFN cell (e.g., the MBSFN cell 802) in relation to other interferences/path loss. Thus, a UE with a high geometry value may have high signal power with low interferences/path loss.

In the first scenario, the switching from BC to UC may be performed based on at least one of three options explained below. According to a first option of the first scenario, the UE may determine to switch from BC to UC based on the above parameters (e.g., parameters such as signal characteristics associated with the BC service, signal characteristics associated with the UC service, timing advance, a location of the UE, path loss, a parameter of the sub-region of the MBSFN area, and geometry). The UE may switch from BC to UC based on the parameters and thresholds associated with the parameters. For example, if the UE determines that the broadcast RSRP is less than a certain threshold, then the UE may switch from BC to UC. According to a second option of the first scenario, a network (e.g., an eNB) may provide the UE with thresholds corresponding to the above parameters, such that the UE may determine to switch from BC to UC based on the thresholds and the above parameters. For example, the eNB may provide the UE with a threshold for a broadcast RSRP, and if the UE determines that the broadcast RSRP is less than the threshold provided by the network, the UE may switch from BC to UC. Thus, according to the second option of the first scenario, the network assists the UE in determining whether to switch from BC to UC by providing the thresholds. According to a third option of the first scenario, the network (e.g., an eNB) may send a handover command to the UE based on the above parameters, where the handover command causes the UE to switch from BC to UC. For example, if the eNB 912 determines that the broadcast RSRP for the UE 954 is less than a certain threshold, the eNB 912 may send a handover command to the UE 954 to cause the UE 954 to switch from BC to UC.

In the second scenario, when the UE moves from a non-MBSFN coverage area to the MBSFN coverage area, the UE may determine to switch from receiving the service (e.g. group call) over UC to receiving the service over BC to ensure service continuity (e.g., receiving the service without interruption). For example, the UE may determine to enter the eMBMS coverage to receive the service over broadcast based on checking the SIB13 acquired by the UE. The switching from UC to BC may be based on one or more parameters, such as signal characteristics associated with the BC service, signal characteristics associated with the UC service, timing advance, a location of the UE, path loss, a parameter of the sub-region of the MBSFN area, and geometry. In the second scenario, the switching from UC to BC may be performed according to at least one of three options explained below.

According to the first option of the second scenario, the UE that is receiving the service over UC continues to measure one or more MBSFN parameter periodically, and may switch to receiving the service over BC when the UE determines that the MBSFN broadcast is available. Thus, the UE continues to measure the one or more MBSFN parameters periodically even when the UE is using the UC bearer. For example, while the UE 954 receives the service over UC via the eNB 914*c*, the UE 954 continues to measure the MBSFN signal strength from the eNB 912, and may switch to receiving the service over BC if the MBSFN signal strength from the eNB 912 is strong (e.g., greater than a certain threshold). According to the second option of the second scenario, an eNB provides the UE with thresholds corresponding to the above parameters, and the UE determines to switch from UC to BC based on the thresholds and the above parameters. If the UE determines that the broadcast signal does not satisfy a condition based on the thresholds provided by the eNB, then the UE may determine to switch from receiving the service over UC to receiving the service over BC. For example, the eNB may provide the UE with a threshold for a unicast RSRP, and if the UE determines that the unicast RSRP is less than the threshold provided by the eNB, the UE may switch from UC to BC. According to a third option of the second scenario, an eNB sends a command to the UE to redirect from UC to BC based on UE's unicast measurement and optionally MBSFN (broadcast) measurement. For example, the unicast measurement and the MBSFN measurement may be measurements of unicast signal strength and MBSFN signal strength, respectively. The unicast measurement and the MBSFN measurement are performed by the UE and are sent to the eNB. Thus, according to the UE's unicast measurement and/or MBSFN measurement, the eNB may determine that the broadcast signal is stronger than the unicast signal, and consequently determine to send a command to the UE to switch from UC to BC. For example, if the UE initially receives the service over unicast via the eNB 914c and the eNB 914c determines that the unicast RSRP for the UE 954 is less than a certain threshold, the eNB 914c may send a command to the UE 954 to cause the UE 954 to switch from UC to BC.

According to a second approach, after the eNB initially transmits a signal to the UE, the eNB may retransmit the signal to improve overall signal quality of an eMBMS. After the eNB initially transmits a broadcast signal (e.g., an eMBMS signal), the eNB may send the UE an indicator of a broadcast retransmission of the signal. The broadcast retransmission indicator indicates to the UE that a signal to be sent to the UE is a retransmission of the signal. Thus, the retransmission indicator may differentiate the initial transmission and the retransmission of the signal. The broadcast retransmission indicator may be sent via MCCH or MSI or dedicated signaling. After transmitting the broadcast retransmission indicator, the eNB retransmits the broadcast signal to the UE. The eNB may retransmit the broadcast signal in the same MSP as an MSP of an initially transmitted eMBMS signal or in a different MSP. The UE combines multiple transmissions (e.g., the broadcast retransmission and the initial transmission) to generate the broadcast signal, in order to improve the signal quality. The eNB may use a normal CP (e.g., 5 μs) instead of an extended CP (e.g., 16.6 μs). It is noted that the eNB may retransmit the signal more than once. Thus, the UE may combine multiple retransmissions of the signal with the initial transmission of the signal to generate the broadcast signal. In such a case, before each of the multiple retransmissions of the signal, the eNB may send a broadcast retransmission indicator corresponding to each of the multiple retransmissions of the signal to the UE.

According to a first solution of the second approach, the eNB performs fixed retransmission based on signal quality of the MBSFN area. The signal quality of the MBSFN area may be known to the network. In particular, based on a signal quality (e.g., an SNR) of the MBSFN area and an MCS, an MCE informs the eNB to repeat transmission (retransmission) of packets of the signal one or more times. For example, if the SNR is low (e.g., below a certain threshold), then the MCE may prompt the eNB to retransmit the signal one or more times. The UE receives a retransmission of the signal, and combines the retransmission of the signal with the initial transmission of the signal to decode the signal. The eNB may perform multiple retransmissions of the signal after the initial transmission. In such a case, the eNB sends a broadcast retransmission indicator corresponding to each of the multiple retransmissions of the signal to the UE before each of the multiple retransmissions of the signal. After receiving the multiple retransmissions of the signal, the UE may combine the initial transmission of the signal and the multiple retransmissions of the signal. If the eNB performs multiple retransmissions of the signal, the eNB may bundle the multiple retransmissions of the signal, and transmit the bundle of the multiple retransmissions to the UE.

FIG. 10A is an example diagram 1000 illustrating the first solution of the second approach. The example diagram 1000 includes a UE 1002, an eNB 1004, and an MCE 1006. The eNB 1004 sends 1012 an initial transmission of a signal to the UE 1002. When the MCE 1006 determines 1014 that an SNR of an MBSFN area associated with the eNB 1004 is low, the MCE prompts 1016 the eNB 1004 to send a retransmission of the signal to the UE 1002. Subsequently, the eNB 1004 sends 1018 a retransmission indicator to the UE 1002, and then sends 1020 a retransmission of the signal to the UE 1002. The UE 1002 combines 1022 the initial transmission of the signal and the retransmission of the signal to decode the signal.

A second solution of the second approach utilizes adaptive retransmission based on feedback from a UE. If the MCE determines based on the feedback from UEs that some UEs did not successfully receive an initial transmission of a broadcast signal from an eNB, then the MCE or the eNB may determine to perform retransmission of the signal. The feedback from the UE may be based on a group NACK approach. According to the group NACK approach, if the UE determines that packet(s) of an initial transmission signal from an eNB cannot be decoded, then the UE sends a NACK via a common resource. The common resource is shared among the UEs within the same group such that the UEs in the same group may send a NACK to the eNB via the common resource. The eNB may decide how many UEs did not receive the transmission based on the power of the signal strength of a NACK received via the common source. Based on the power of the signal strength of NACK from a group of the UEs, the eNB may be configured for the group of the UEs. The eNB may also be configured for the group of the UEs based on the power of signal strength of ACK from the group of the UEs.

According to a first option of the second approach's second solution, retransmission of the signal is performed based on the MBSFN measurements. A common NACK resource is assigned for the UEs in the same group and is shared by the UEs in the same group. An eNB may send information on the common NACK resource to each of the UEs in the same group that are served by (e.g., camped on) the eNB. In one example, the UEs in the same group may be served by multiple eNBs. The information on the common NACK resource may be sent to the UEs via a SIB 13 or an MCCH or dedicated signaling. When a UE fails to decode packets of the signal of an initial transmission, the UE sends a NACK to the eNB via the common NACK resource. Each eNB of the MBSFN reports a received energy metric of a NACK to an MCE. Based on the energy metric of the NACK, the MCE decides whether to prompt the eNB to re-transmit the packets of the signal to the UE. For example, the MCE may estimate how many UEs in the same group did not receive the initial transmission from the eNB based on the energy metric of NACK, and may determine whether to prompt the eNB to perform retransmission based on the estimation. In an aspect, the MCE may decide to prompt the one or more eNBs to retransmit the packets based on a signal report such as the RSSI reports. For example, the MCE may decide to prompt the one or more eNBs to retransmit the packet if an RSSI in the RSSI report is less than a certain threshold. The MCE may decide to prompt retransmission on all of the cells in the MBSFN or on a subset of the cells in the MBSFN. The eNB may send a retransmission indicator to the UE to inform that the signal being sent to the UE is retransmission. The indication of retransmission may be a new data indicator (NDI). After sending the retransmission indicator to the UE, the eNB sends retransmission of the signal to the UE. The eNB may perform retransmission of the signal to the UE on a next MSP. When the UE receives a retransmitted signal, the UE combines the retransmitted signal with an initially transmitted signal.

FIG. 10B is an example diagram 1030 illustrating a first option of the second approach's second solution. The example diagram 1030 includes UEs 1032a-1032c in a same group, an eNB 1034, and an MCE 1036. The eNB 1034 sends 1042 information on a common NACK resource to the UE 1032a. The eNB 1034 may send information on the common NACK resource to the UEs 1032b and 1032c. The eNB 1034 sends 1044 an initial transmission of a signal to the UE 1032a. The common NACK resource is shared by the UEs 1032a-1032c in the same group. When the UE 1032a determines 1046 that UE 1032a fails to decode the signal successfully, the UE 1032a sends 1048 a NACK to the eNB 1034 via the common NACK resource. The UEs 1032b and 1032c may also send a NACK to the eNB 1034 via the common NACK resource upon failing to successfully decode the signal. The eNB 1034 reports 1050 an energy metric of the received NACK to the MCE 1036. When the MCE 1036 determines 1052 to retransmit the signal based on the energy metric, the MCE 1036 prompts 1054 the eNB 1034 to send a retransmission of the signal to the UE 1032a. Subsequently, the eNB 1034 sends 1056 a retransmission indicator to the UE 1032a, and then sends 1058 a retransmission of the signal to the UE 1032a. The UE 1032a combines 1060 the initial transmission of the signal and the retransmission of the signal to decode the signal.

According to a second option of the second approach's second solution, retransmission of the signal is performed based on a cell. The common NACK resource is configured per cell, or per group per cell. It is noted that the common NACK resource is configured per group per cell when multiple common NACK resources are configured for each cell. The common NACK resource is assigned for the UEs in the same group that are served by (e.g., camped on) the eNB and is shared by the UEs in the same group. In one example, the UEs in the same group may be served by multiple eNBs. An eNB sends the configured common NACK resource and a group radio network temporary identifier (G-RNTI) to a UE. The common NACK resource and the G-RNTI may be sent to the UE via a SIB13. Each TMGI may be assigned with multiple pairs of a G-RNTI and a NACK resource in a cell. When the UE fails to decode packets of the signal of an initial transmission, the UE sends a NACK to an eNB via the configured common NACK resource. The eNB determines whether to retransmit a signal to the UE based on the received energy metric of the NACK. For example, the eNB may determine whether to retransmit the signal to the UE if the received energy metric of the NACK is less than a certain threshold. If the eNB determines to retransmit the signal, the eNB sends a retransmission indicator to the UE. Subsequently, the eNB schedules a transmission addressed by G-RNTI for the retransmission of the signal, and then performs the retransmission of the signal to the UE based on scheduling on the G-RNTI. When the UE receives the retransmitted signal, the UE combines the retransmitted signal with the initially transmitted signal.

FIG. 10C is an example diagram 1070 illustrating a second option of the second approach's second solution. The example diagram 1070 includes UEs 1072a-1072c in a same group and an eNB. The eNB 1074 sends 1082 information on a common NACK resource and a G-RNTI to the UE 1072a. The eNB 1074 may send information on the common NACK resource to the UEs 1072b and 1072c. The eNB 1074 sends 1084 an initial transmission of a signal to the UE 1072a. When the UE 1072 determines 1086 that the signal is not successfully decoded, the UE 1072a sends 1088 a NACK to the eNB 1074 via the common NACK resource. When the eNB 1074 determines 1090 to retransmit the signal based on the energy metric of the NACK, the eNB 1074 sends 1092 a retransmission indicator to the UE 1072a, and then sends 1094 a retransmission of the signal to the UE 1072a. The UE 1072a combines 1096 the initial transmission and the retransmission of the signal to decode the signal.

Figure 11:
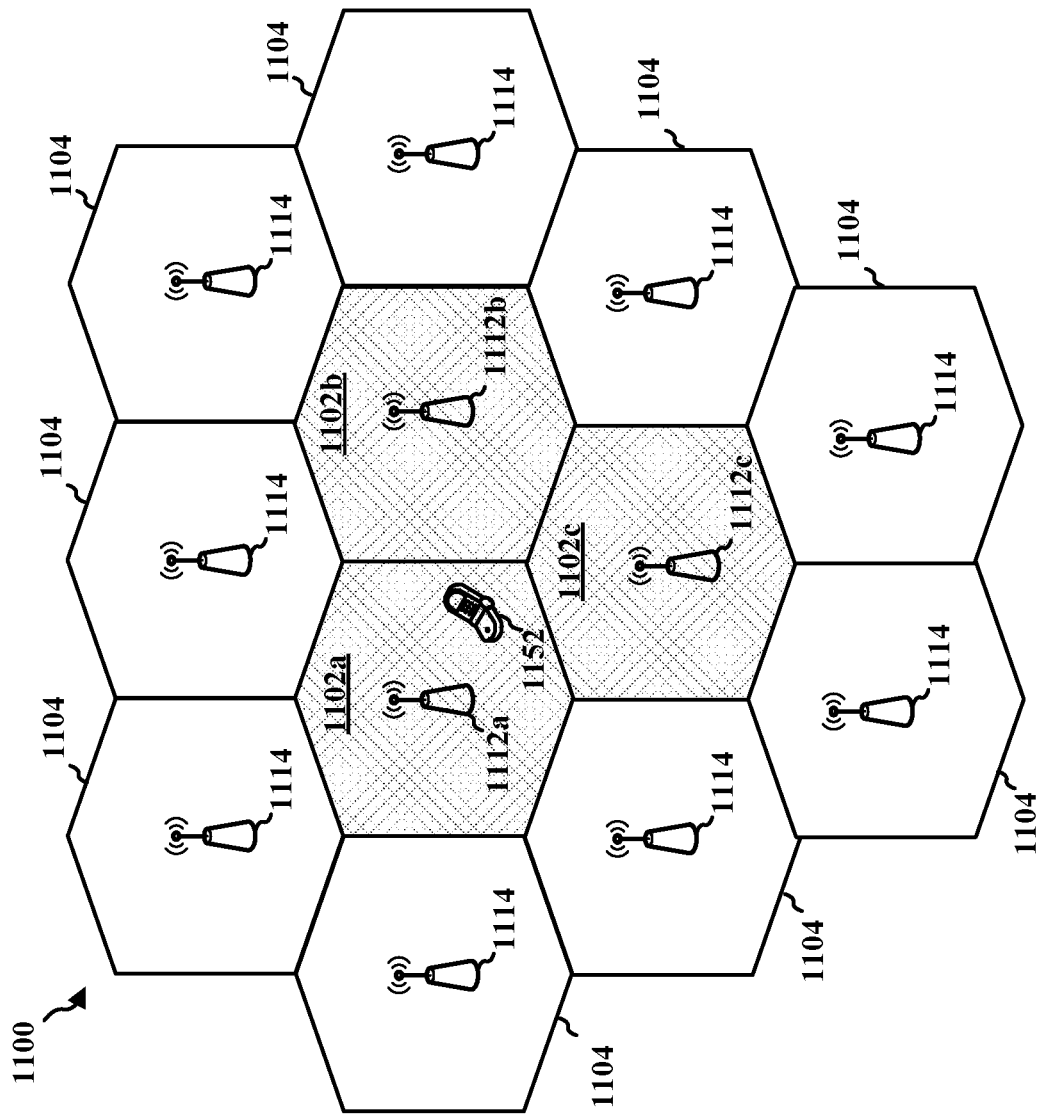
FIG. 11 is an example network with multiple MBSFN cells.

According to a third approach, the UE receives MBMS signals from multiple cells that are not synchronized and combines the received signals even if the cells are not synchronized. Depending on a degree of synchronization, two different scenarios may be treated differently. FIG. 11 is an example network 1100 with multiple MBSFN cells. MBSFN eNBs 1112a-1112c are assigned to MBSFN cells 1102a-1102c, respectively. Each of non-MBSFN eNBs 1114 is assigned to a corresponding non-MBSFN cell 1104. For a UE 1152 in the MBSFN cell 1102, the serving cell is the MBSFN cell 1102a, and neighbor cells are MBSFN cells 1112b and 1112c. The UE 1152 receives signals from the serving cell and the neighbor cells. The neighbor cells may be adjacent to the serving cell. In a first scenario, the signal from the serving cell and the signals from the neighbor cells are loosely synchronized. In a second scenario, the signal from the serving cell and the signals from the neighbor cells are asynchronous. In one example, if the UE determines that a degree of synchronization of the serving cell signal and a neighbor cell signal is greater than or equal to a threshold, the UE may determine that the serving cell and the neighbor cell are at least loosely synchronized. On the contrary, if the UE determines that the degree of synchronization of the serving cell signal and a neighbor cell signal is less than the threshold, the UE may determine that the serving cell and the neighbor cell are asynchronous. It is noted that for a UE that is capable of carrier aggregation (CA), the UE may use another radio chain to listen to other cells.

In a first scenario where the serving cell and the neighbor cell are loosely synchronized, the UE buffers for a timing difference between a serving cell MBMS signal and a neighbor cell MBMS signal. The UE may buffer for the timing difference by buffering log-likelihood ratios (LLRs) for the timing difference. In particular, when the serving cell and the neighbor cell are loosely synchronized, the UE may not buffer the entire subframe, but instead may buffer for the timing difference to combine the signals based on the timing difference. Because the UE may buffer only for the timing difference (not for the entire subframe), the memory requirement for the buffering is low. For example, if the synchronization error is small (e.g., a half symbol or around 30 micro seconds), the buffer according to the first scenario needs to hold only 35 micro seconds of data. In this example, the synchronization error of 35 micro seconds is small compared to one subframe (1 ms), but large enough to be more than a CP so that the signals may not combine directly over the air. The UE may buffer multiple timing differences between the serving cell MBMS signal and multiple neighbor cell MBMS signals, such that the serving cell MBMS signal and multiple neighbor cell MBMS signals may be synchronized.

In a second scenario where the serving cell and the neighbor cell are asynchronous, the UE buffers the entire subframe of each signal, and then combines the signals. The UE is configured to measure the frame offsets between the signals before buffering.

Figure 12:
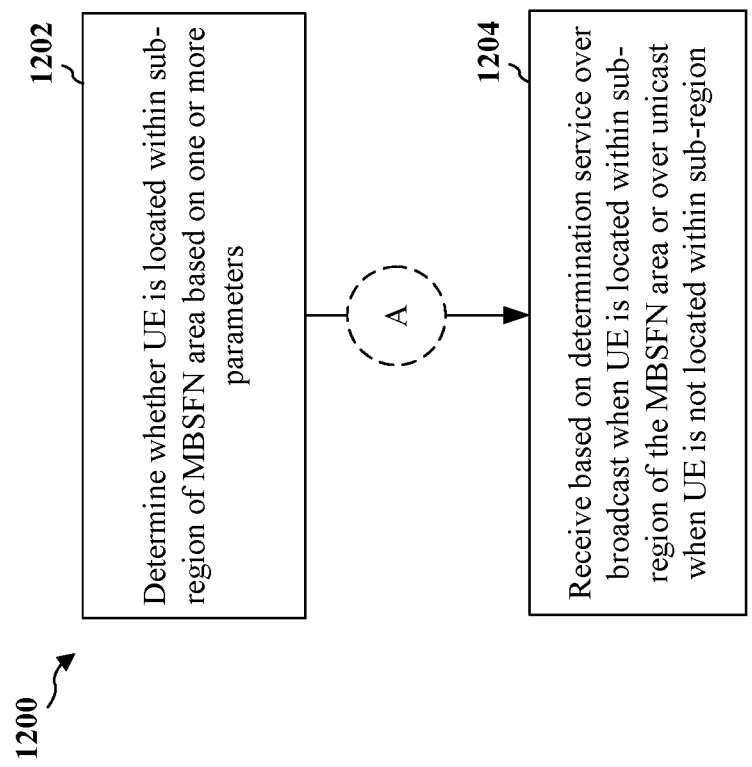
FIG. 12 is a flow chart of a method of wireless communication according to a first approach.

FIG. 12 is a flow chart 1200 of a method of wireless communication according to a first approach. The method may be performed by a UE. At 1202, the UE determines whether the UE is located within a sub-region of an MBSFN area based on one or more parameters. At 1204, the UE receives, based on the determination at 1202, a service over broadcast when the UE is located within the sub-region of the MBSFN area or over unicast when the UE is not located within the sub-region. In an aspect, the MBSFN area is smaller than a unicast area. In an aspect, the one or more parameters may include a characteristic associated with a broadcast service, a characteristic associated with a unicast service, a timing advance value, a location of the UE, a path loss value, a parameter of the sub-region of the MBSFN area, a geometry, or any combination thereof. For example, referring back to FIG. 9, the small MBSFN area may provide reduced eMBMS coverage in a sub-region 932 of the MBSFN cell 902, where the sub-region 932 is smaller than an MBSFN area covered by the MBSFN cell 902. For example, referring back to FIG. 9, the UE receives the service over broadcast if the UE (e.g., a UE 952) is within the sub-region 932, and the UE receives the service over unicast if the UE (e.g., a UE 954) is outside the sub-region 932. As discussed supra, for example, a number of cells in a small MBSFN may be smaller than a number of cells in a surrounding unicast network.

FIG. 13A is a flow chart 1300 of a method of wireless communication expanding from FIG. 12. The method may be performed by a UE, where the UE initially receives the service over broadcast. At 1302, the UE switches from reception of the service over broadcast to reception of the service over unicast based on the one or more parameters. For example, as discussed supra, the UE may determine to switch from BC to UC based on parameters such as a characteristic associated with a broadcast service, a characteristic associated with a unicast service, a timing advance value, a location of the UE, a path loss value, a parameter of the sub-region of the MBSFN area, and a geometry.

FIG. 13B is a flow chart 1330 of a method of wireless communication expanding from FIG. 12. At 1332, the UE receives, from a base station, one or more thresholds associated with the one or more parameters. At 1334, the UE switches between reception of the service over broadcast and reception of the service over unicast based on the one or more thresholds and the one or more parameters. In one aspect, for example, as discussed supra, an eNB may provide the UE with thresholds corresponding to the parameters, such that the UE may determine to switch from BC to UC based on the thresholds and the parameters. For example, as discussed supra, the eNB may provide the UE with a threshold for a broadcast RSRP, and if the UE determines that the broadcast RSRP is less than the threshold provided by the network, the UE may switch from BC to UC. In another aspect, for example, as discussed supra, an eNB provides the UE with thresholds corresponding to the above parameters, and the UE determines to switch from UC to BC based on the thresholds and the above parameters. For example, as discussed supra, if the UE determines that the broadcast signal does not satisfy a condition based on the thresholds provided by the eNB, then the UE may determine to switch from receiving the service over UC to receiving the service over BC.

FIG. 13C is a flow chart 1350 of a method of wireless communication expanding from FIG. 12. The method may be performed by a UE, where the UE initially receives the service over broadcast. At 1352, the UE receives a handover command from a base station, where the handover command is generated by the base station based on the one or more parameters. At 1354, the UE switches from reception of the service over broadcast to reception of the service over unicast based on the handover command. For example, as discussed supra, the network may send a handover command to the UE based on the parameters, where the handover command causes the UE to switch from BC to UC. For example, as discussed supra, if the eNB 912 determines that the broadcast RSRP for the UE 954 is less than a certain threshold, the eNB 912 may send a handover command to the UE 954 to cause the UE 954 to switch from BC to UC.

Figure 14B:
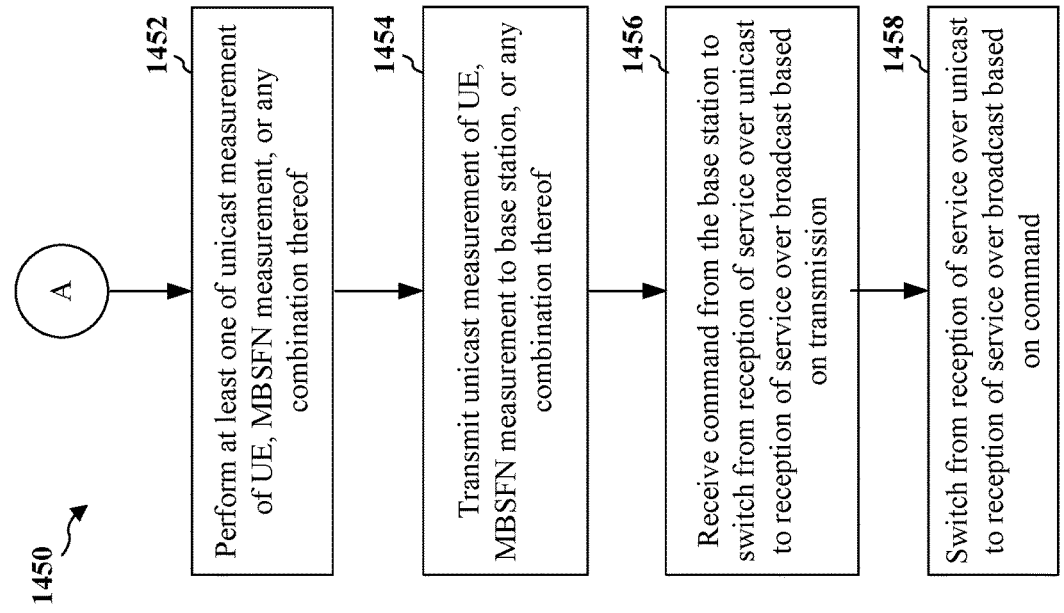
FIGS. 14A-14B are flow charts of a method of wireless communication expanding from FIG. 12.
Figure 14A:
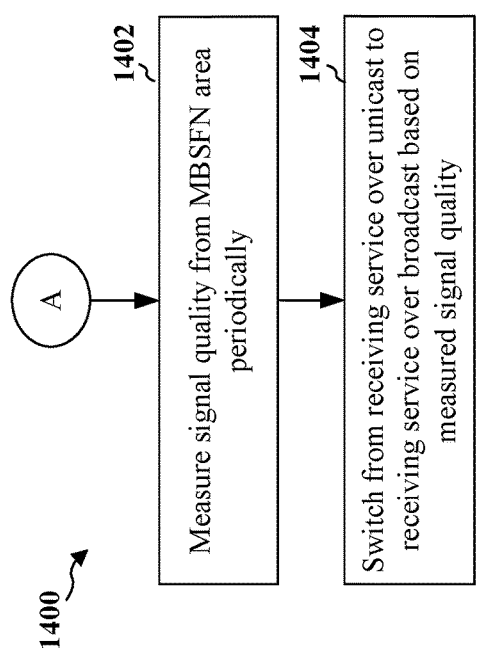

FIG. 14A is a flow chart 1400 of a method of wireless communication expanding from FIG. 12. The method may be performed by a UE, where the UE initially receives the service over unicast. At 1402, the UE measure signal quality from the MBSFN area. At 1404, the UE switches from receiving the service over unicast to receiving the service over broadcast based on the measured signal quality. For example, as discussed supra, the UE that is receiving the service over UC continues to measure the MBSFN periodically, and may switch to receiving the service over BC when the UE determines that MBSFN broadcast is available. For example, referring back to FIG. 9, while the UE 954 receives the service over UC via the eNB 914c, the UE 954 continues to measure the MBSFN signal strength from the eNB 912, and may switch to receiving the service over BC if the MBSFN signal strength from the eNB 912 is strong.

FIG. 14B is a flow chart 1450 of a method of wireless communication expanding from FIG. 12. The method may be performed by a UE, where the UE initially receives the service over unicast. At 1452, the UE performs a unicast measurement of the UE, an MBSFN measurement, or any combination thereof. At 1454, the UE transmits the unicast measurement of the UE, the MBSFN measurement, or a combination thereof to a base station. At 1456, the UE receives a command from the base station to switch from receiving the service over unicast to receiving the service over broadcast based on the transmission. At 1458, the UE switches from reception of the service over unicast to reception of the service over broadcast based on the command. For example, as discussed supra, an eNB sends a handover command to the UE to redirect from UC to BC based on UE's unicast measurement and optionally MBSFN (broadcast) measurement. The unicast measurement and the MBSFN measurement are performed by the UE and are sent to the eNB. Referring back to FIG. 9, for example, if the UE initially receives the service over unicast via the eNB 914c and the eNB 914c determines that the unicast RSRP for the UE 954 is less than a certain threshold, the eNB 914c may send a command to the UE 954 to cause the UE 954 to switch from UC to BC.

Figure 15:
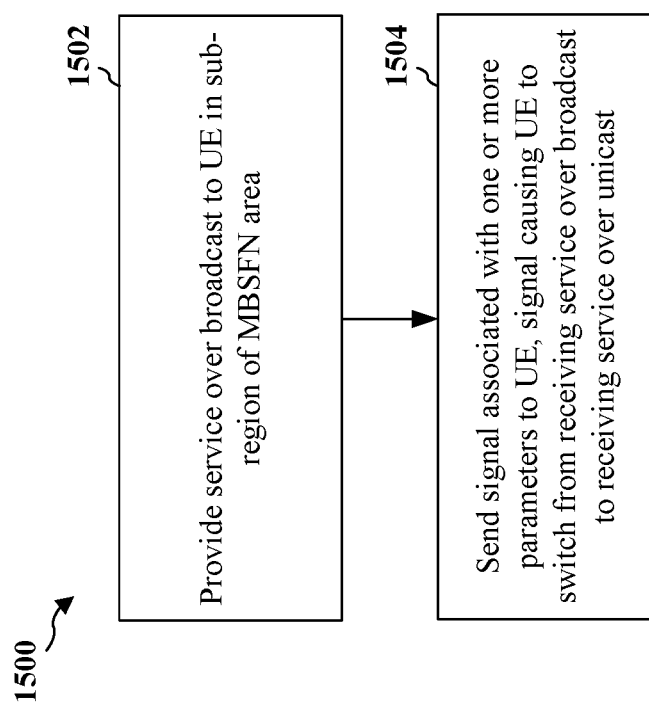
FIG. 15 is a flow chart of a method of wireless communication according to a first approach.

FIG. 15 is a flow chart 1500 of a method of wireless communication according to a first approach. The method may be performed by a base station. At 1502, the base station provides a service over broadcast to a UE in a sub-region of an MBSFN area. At 1504, the base station sends a signal associated with one or more parameters to the UE, the signal causing the UE to switch from receiving the service over broadcast to receiving the service over unicast. In an aspect, the MBSFN area is smaller than a unicast area. Referring back to FIG. 9, for example, as the UE moves from the sub-region 932 to an outside of the sub-region 932, the UE switches from receiving over BC (e.g., via eMBMS) to receiving over UC to receive a service (e.g., a group call)

continuously, where the switching from BC to UC may be based on one or more parameters and other information received from the base station. As discussed supra, for example, a number of cells in a small MBSFN may be smaller than a number of cells in a surrounding unicast network.

In an aspect, the one or more parameters may include a characteristic associated with a broadcast service, a characteristic associated with a unicast service, a timing advance value, a location of the UE, a path loss value, a parameter of the sub-region of the MBSFN area, and a geometry. In an aspect, the signal may include one or more thresholds for the one or more parameters, the one or more thresholds for the one or more parameters causing the UE to switch from receiving the service over broadcast to receiving the service over unicast. As discussed supra, an eNB provides the UE with thresholds corresponding to the above parameters, such that the UE may determine to switch from BC to UC based on the thresholds and the above parameters. In an aspect, the base station may determine to send a handover command in the signal to the UE based on the one or more parameters, and the handover command causes the UE to switch from receiving the service over broadcast to receiving the service over unicast. As discussed supra, an eNB sends a handover command to the UE based on the above parameters, where the handover command causes the UE to switch from BC to UC.

Figure 16:
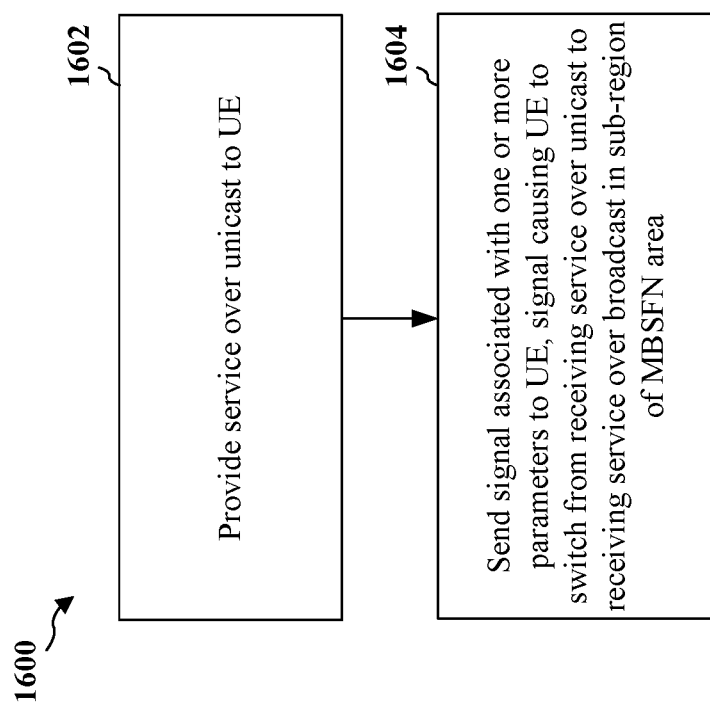
FIG. 16 is a flow chart of a method of wireless communication according to a first approach.

FIG. 16 is a flow chart 1600 of a method of wireless communication according to a first approach. The method may be performed by a base station. At 1602, the base station provides a service over unicast to a UE. At 1604, the base station sends a signal associated with one or more parameters to the UE, the signal causing the UE to switch from receiving the service over unicast to receiving the service over broadcast in a sub-region of an MBSFN area. In an aspect, the MBSFN area is smaller than a unicast area. As discussed supra, when the UE moves from a non-MBSFN coverage area to the MBSFN coverage area, the UE may determine to switch from receiving the service (e.g. group call) over UC to receiving the service over BC to ensure service continuity, where the switching from UC to BC may be based on one or more parameters and other information received from the base station.

In an aspect, the one or more parameters may include a characteristic associated with a broadcast service, a characteristic associated with a unicast service, a timing advance value, a location of the UE, a path loss value, a parameter of the sub-region of the MBSFN area, and a geometry. In an aspect, the signal may include one or more thresholds for the one or more parameters, the one or more thresholds for the one or more parameters causing the UE to switch from receiving the service over unicast to receiving the service over broadcast. As discussed supra, an eNB provides the UE with thresholds corresponding to the above parameters, and the UE determines to switch from UC to BC based on the thresholds and the above parameters. In an aspect, the base station may determine to send a command in the signal to the UE based on the one or more parameters, and the command causes the UE to switch from receiving the service over unicast to receiving the service over broadcast, the command being based on a unicast measurement of the UE, an MBSFN measurement, or any combination thereof. As discussed supra, an eNB sends a command to the UE to redirect from UC to BC based on UE's unicast measurement and optionally MBSFN (broadcast) measurement.

Figure 17:
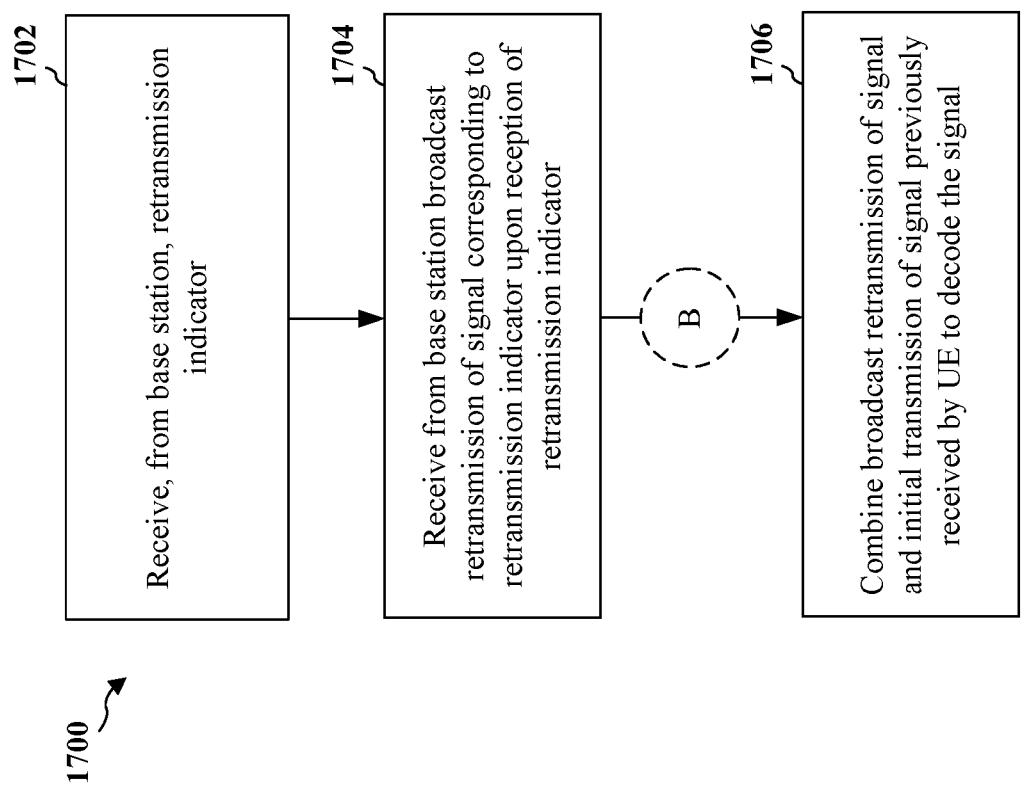
FIG. 17 is a flow chart of a method of wireless communication according to a second approach.

FIG. 17 is a flow chart 1700 of a method of wireless communication according to a second approach. The method may be performed by a UE. At 1702, the UE receives, from a base station, a retransmission indicator. At 1704, the UE receives, from the base station, a broadcast retransmission of a signal corresponding to the retransmission indicator upon reception of the retransmission indicator. At 1706, the UE combines the broadcast retransmission of the signal and an initial transmission of the signal previously received by the UE to decode the signal. For example, as discussed supra, the eNB may send the UE an indicator of a broadcast retransmission of the signal. As discussed supra, after transmitting the broadcast retransmission indicator, the eNB retransmits the broadcast signal to the UE. As discussed supra, the UE combines the broadcast retransmission and the initial transmission to generate the broadcast signal, in order to improve the signal quality. As discussed supra, the UE may combine multiple retransmissions of the signal with the initial transmission of the signal to generate the broadcast signal. In such a case, before each of the multiple retransmissions of the signal, the eNB may send a broadcast retransmission indicator corresponding to each of the multiple retransmissions of the signal to the UE.

In an aspect, the broadcast retransmission is performed in the same MSP as the initial transmission of the signal or a different MSP from the initial transmission of the signal. As discussed supra, the eNB may retransmit the broadcast signal in the same MSP as an MSP of an initially transmitted eMBMS signal or in a different MSP.

Figure 18:
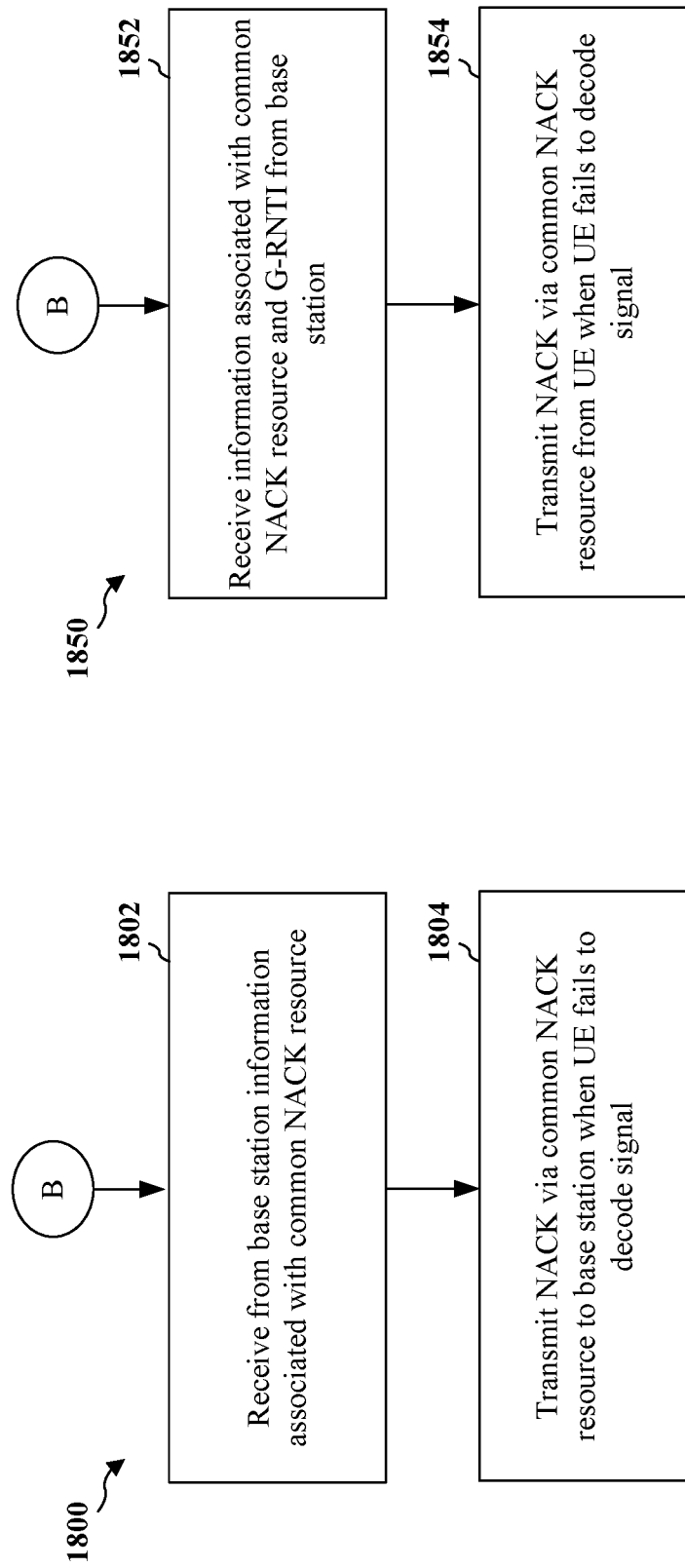
FIGS. 18A and 18B are flow charts of a method of wireless communication expanding from FIG. 17.

FIG. 18A is a flow chart 1800 of a method of wireless communication expanding from FIG. 17. The method may be performed by a UE. At 1802, the UE receives from the base station information associated with a common NACK resource. At 1804, the UE transmits a NACK via the common NACK resource to the base station when the UE fails to decode the signal. In an aspect, the common NACK resource is shared by a group of UEs including the UE. In an aspect, the UE receives the broadcast retransmission of the signal from the base station based on a determination by the MCE to retransmit the signal based on an energy metric of the transmitted NACK. For example, as discussed supra, an eNB may send information on a common NACK resource to each of the UEs in the same group. As discussed supra, when the UE fails to decode packets of the signal of the initial transmission, the UE sends a NACK to the eNB via the common NACK resource. As discussed supra, based on the energy metric of the NACK, the MCE decides whether to prompt the eNB to re-transmit the packets of the signal to the UE. As discussed supra, the common NACK resource is assigned for the UEs in the same group and is shared by the UEs in the same group.

In an aspect, the information on the NACK resource is received at the UE via a SIB13, a MCCH, dedicated signaling, or any combination thereof. In an aspect, broadcast retransmission of the signal is received in one or more packets of a next MSP. In an aspect, the UE receives the retransmission indicator in the MSI before the at least one broadcast retransmission to differentiate an initial transmission and the at least one broadcast retransmission.

FIG. 18B is a flow chart 1850 of a method of wireless communication expanding from FIG. 17. The method may be performed by a UE. At 1852, the UE receives information associated with a common NACK resource and a G-RNTI from the base station. At 1854, the UE transmits a NACK via the common NACK resource from the UE when the UE fails to decode the signal. In an aspect, the common NACK resource is shared by a group of UEs including the UE. In an aspect, the UE receives the broadcast retransmission of the signal based on scheduling on the G-RNTI and the retransmission indicator. For example, as discussed supra, an eNB sends the configured NACK resource and a G-RNTI to the UE. As discussed supra, when the UE fails to decode packets of the signal, the UE sends a NACK to an eNB via the configured NACK resource. As discussed supra, if the eNB determines to retransmit the signal, the eNB sends a retransmission indicator to the UE. Subsequently, as discussed supra, the eNB schedules a transmission addressed by G-RNTI for the retransmission of the signal, and then performs the retransmission of the signal to the UE based on scheduling on the G-RNTI. As discussed supra, the common NACK resource is assigned for the UEs in the same group and is shared by the UEs in the same group.

In an aspect, the at least one broadcast retransmission is scheduled according to the G-RNTI if the base station determines to retransmit. In an aspect, the NACK resource and the G-RNTI are configured per cell or per group per cell. In an aspect, the information on the NACK resource is received at the UE via a SIB 13, an MCCH, dedicated signaling, or any combination thereof.

Figure 19:
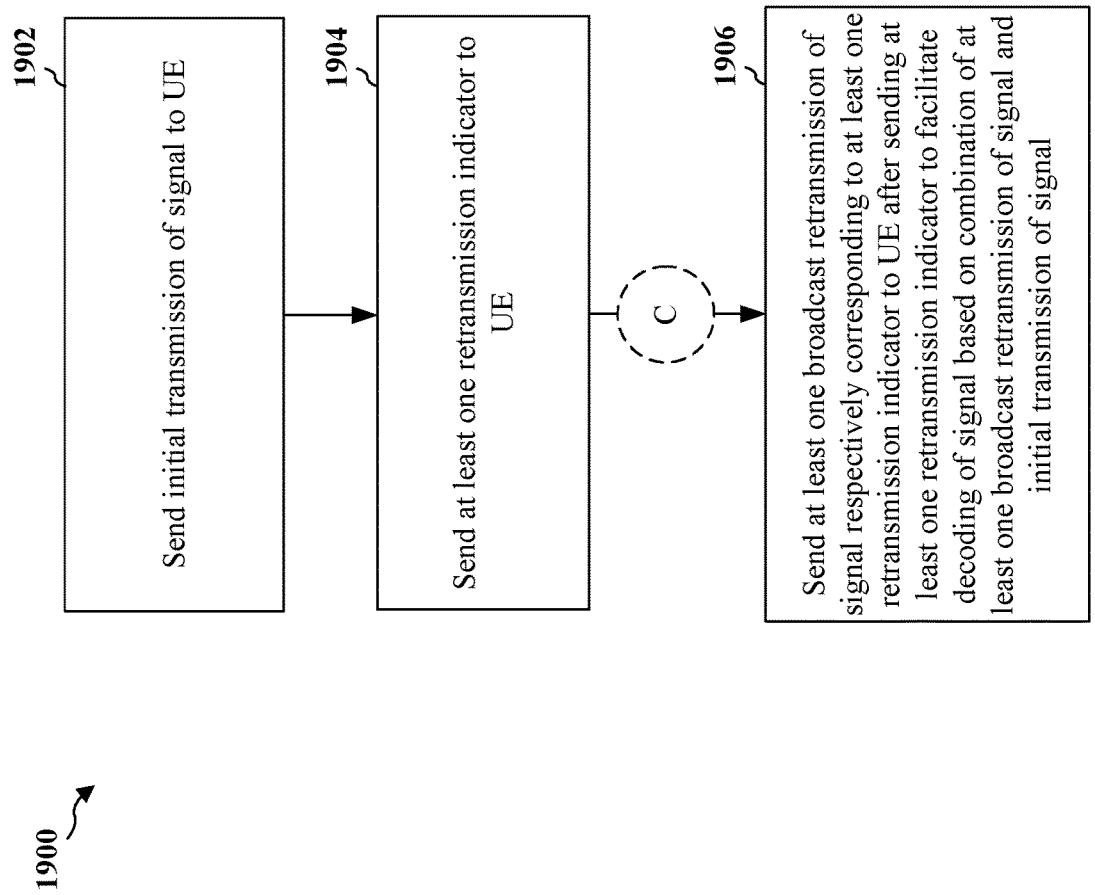
FIG. 19 is a flow chart of a method of wireless communication according to a second approach.

FIG. 19 is a flow chart 1900 of a method of wireless communication according to a second approach. The method may be performed by a base station. At 1902, the base station sends an initial transmission of a signal to a UE. At 1904, the base station sends at least one retransmission indicator to the UE. At 1906, the base station sends at least one broadcast retransmission of the signal respectively corresponding to the at least one retransmission indicator to the UE after sending the at least one retransmission indicator to facilitate decoding of the signal based on a combination of the at least one broadcast retransmission of the signal and the initial transmission of the signal. For example, as discussed supra, after the eNB initially transmits a broadcast signal (e.g., an eMBMS signal), the eNB may send the UE an indicator of a broadcast retransmission of the signal. As discussed supra, after transmitting the broadcast retransmission indicator, the eNB retransmits the broadcast signal to the UE, such that UE may combine the broadcast retransmission and the initial transmission to generate the broadcast signal.

In an aspect, the at least one broadcast retransmission is performed using the same multicast channel scheduling period (MSP) as an MSP of the initial transmission of the signal or using a different MSP from the MSP of the initial transmission of the signal.

In an aspect, the base station is prompted by an MCE to send the at least one broadcast retransmission of the signal to the UE one or more times based on signal quality of a single site MBSFN area and an MCS. In an aspect, the base station is prompted to send the at least one broadcast retransmission of the signal when an SNR of the single site MBSFN area is less than or equal to an SNR threshold. For example, as discussed supra, based on a signal quality (e.g., an SNR) of the MBSFN area and an MCS, an MCE informs eNBs to repeat transmission (retransmission) of each packet one or more times. As discussed supra, for example, if the SNR is low (e.g., below a certain threshold), then the MCE may inform the eNBs to retransmit the signal one or more times.

Figures 20A, 20B:
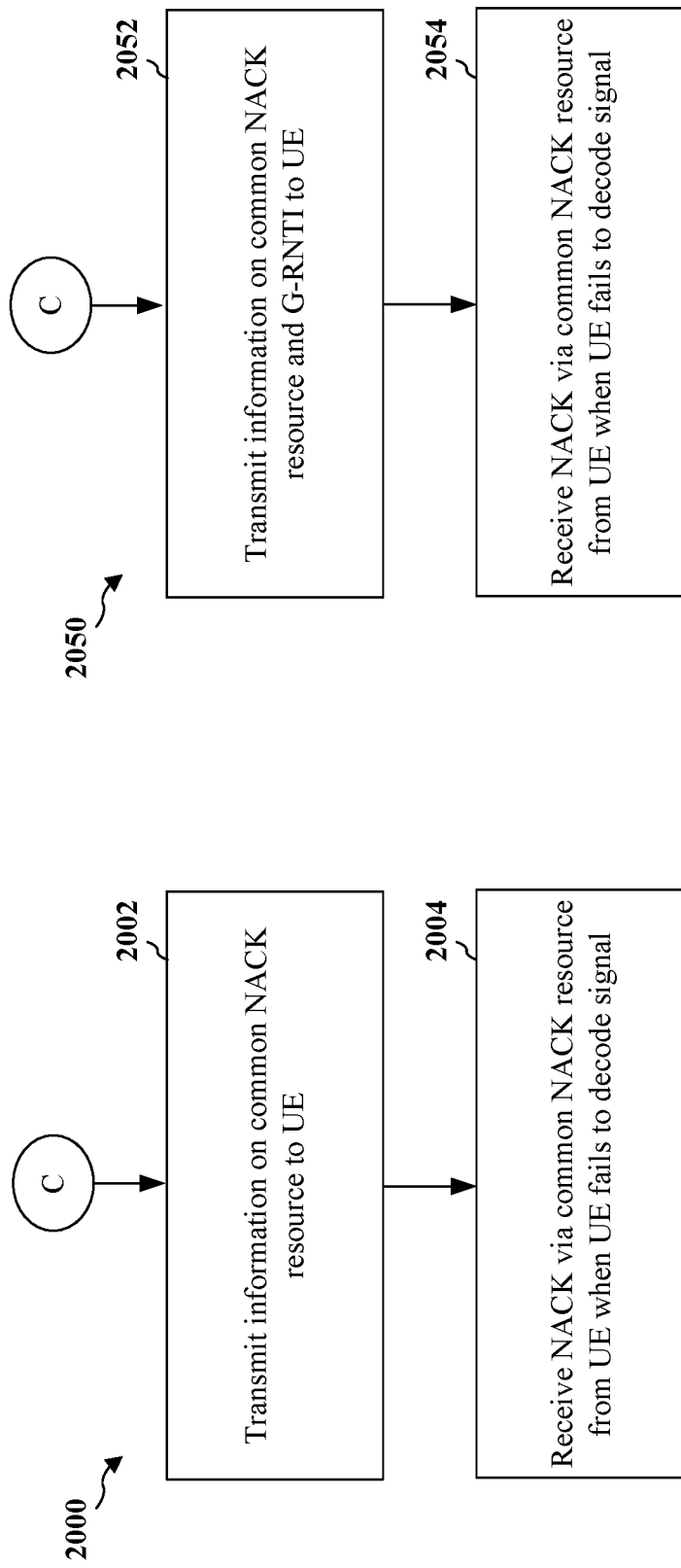
FIGS. 20A and 20B are flow charts of a method of wireless communication expanding from FIG. 17.

FIG. 20A is a flow chart 2000 of a method of wireless communication expanding from FIG. 17. The method may be performed by a base station. At 2002, the base station transmits information on a common NACK resource to the UE. At 2004, the base station receives an NACK via the common NACK resource from the UE when the UE fails to decode the signal. In an aspect, the common NACK resource is shared by a group of UEs including the UE, the group of UEs being served by one or more base stations including the base station. In an aspect, the base station sends the at least one broadcast retransmission of the signal to the UE based on a determination by the MCE to retransmit the signal based on an energy metric of the NACK received at the one or more base stations. For example, as discussed supra, an eNB may send information on the common NACK resource to each of the UEs in the same group. As discussed supra, when a UE fails to decode packets of the signal of the initial transmission, the UE sends a NACK to the eNB via the common NACK resource. As discussed supra, based on the energy metric of the NACK, the MCE decides whether to prompt the eNB to re-transmit the packets of the signal to the UE. As discussed supra, the common NACK resource is assigned for the UEs in the same group and is shared by the UEs in the same group In an aspect, the information on the NACK resource is transmitted to the UE via a SIB13, an MCCH, dedicated signaling, or any combination thereof. In an aspect, the at least one broadcast retransmission is sent in one or more packets of a next MSP.

FIG. 20B is a flow chart 2050 of a method of wireless communication expanding from FIG. 17. The method may be performed by a base station. At 2052, the base station transmits information on a common NACK resource and a G-RNTI to a UE. At 2054, the base station receives an NACK via the common NACK resource from the UE when the UE fails to decode the signal. In an aspect, the common NACK resource is shared by a group of UEs including the UE, the group of UEs being served by one or more base stations including the base station. In an aspect, the base station sends the at least one broadcast retransmission of the signal to the UE based on an energy metric of the received NACK and scheduling on the G-RNTI. As discussed supra, for example, an eNB sends the configured NACK resource and a G-RNTI to the UE. As discussed supra, when the UE fails to decode packets of the signal, the UE sends a NACK to an eNB via the configured NACK resource. As discussed supra, the common NACK resource is assigned for the UEs in the same group and is shared by the UEs in the same group In an aspect, the at least one broadcast retransmission is scheduled according to the G-RNTI if the base station determines to retransmit. In an aspect, the NACK resource and the G-RNTI are configured per cell or per group per cell. In an aspect, the information on the NACK resource is transmitted to the UE via a SIB 13, an MCCH, dedicated signaling, or any combination thereof.

Figure 21:
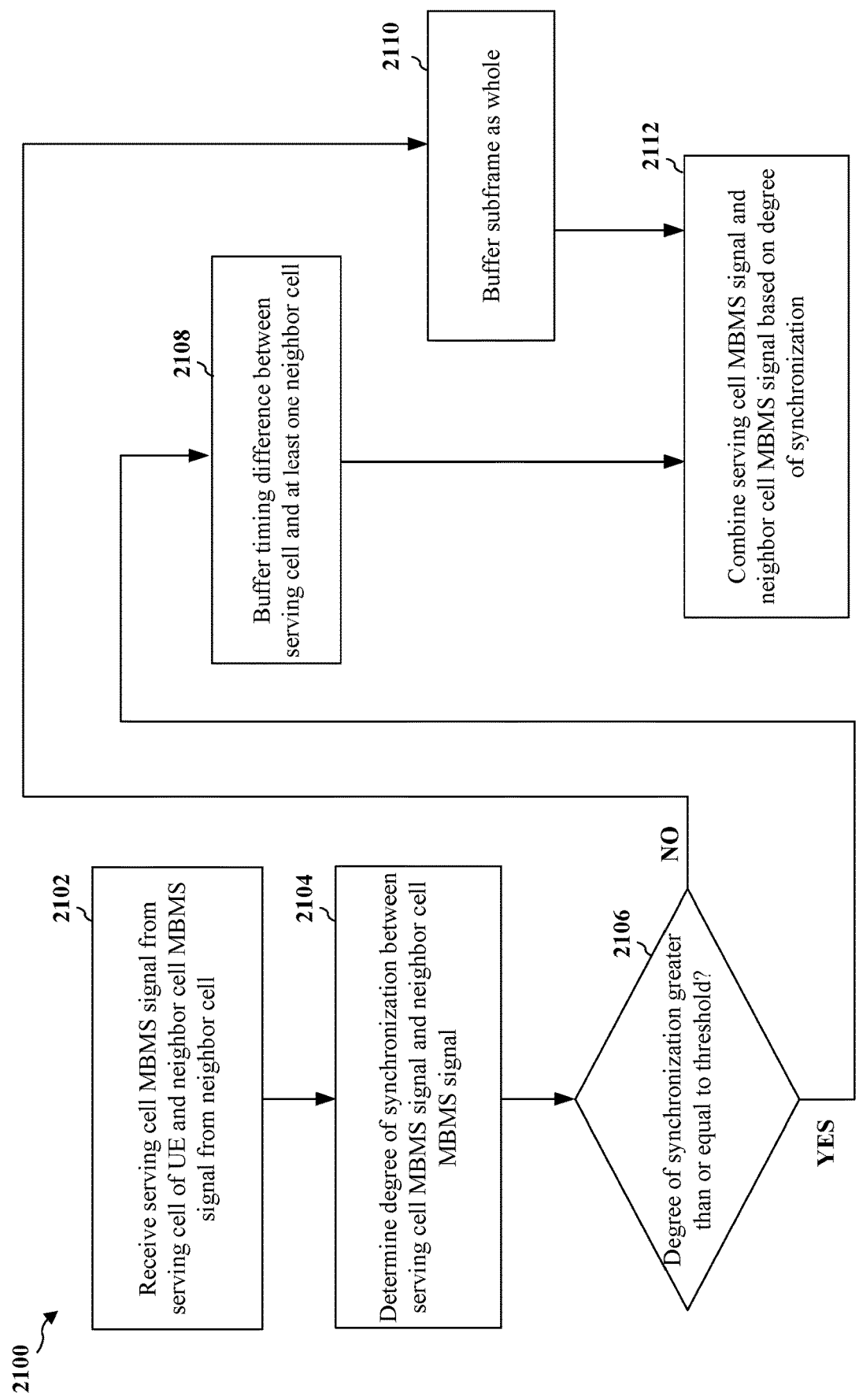
FIG. 21 is a flow chart of a method of wireless communication according to a third approach.

FIG. 21 is a flow chart 2100 of a method of wireless communication according to a third approach. The method may be performed by a UE. At 2102, the UE receives a serving cell MBMS signal from a serving cell of the UE and at least one neighbor cell MBMS signal from at least one neighbor cell. For example, referring back to FIG. 11, for a UE 1152 in the MBSFN cell 1102, the serving cell is the MBSFN cell 1102a, and neighbor cells are MBSFN cells 1112b and 1112c. The UE 1152 receives signals from the serving cell and the neighbor cells.

At 2104, the UE determines a degree of synchronization between the serving cell MBMS signal and the neighbor cell MBMS signal. At 2106, the UE determines whether the degree of synchronization is greater than or equal to a threshold. If the degree of synchronization is greater than or equal to the threshold, at 2108, the UE buffers a timing difference between the serving cell and the at least one neighbor cell upon a determination that the degree of synchronization is greater than or equal to a threshold, and subsequently combines at 2112 the serving cell MBMS signal and the neighbor cell MBMS signal based on the degree of synchronization. In an aspect, the combining is based on the timing difference. In an aspect, the buffering the timing difference may include buffering one or more LLRs for the timing difference. For example, as discussed supra, if the UE determines that the degree of synchronization of the serving cell signal and a neighbor cell signal is greater than or equal to a threshold, the UE determines that the serving cell and the neighbor cell are at least loosely synchronized. In such a case, as discussed supra, the UE buffers a timing difference between a serving cell MBMS signal and an neighbor cell MBMS signal to combine the signals based on the timing difference.

If the degree of synchronization is less than the threshold, at 2110, the UE buffers a subframe as a whole upon determining that the degree of synchronization is less than a threshold, and subsequently combines at 2112 the serving cell MBMS signal and the neighbor cell MBMS signal based on the degree of synchronization. In an aspect, the combining is based on the buffered subframe. For example, as discussed supra, if the UE determines that the degree of synchronization of the serving cell signal and a neighbor cell signal is less than a threshold, the UE determines that the serving cell and the neighbor cell are asynchronous. In such a case, as discussed supra, the UE buffers the entire subframe of each signal, and then combines the signals.

Figure 22:
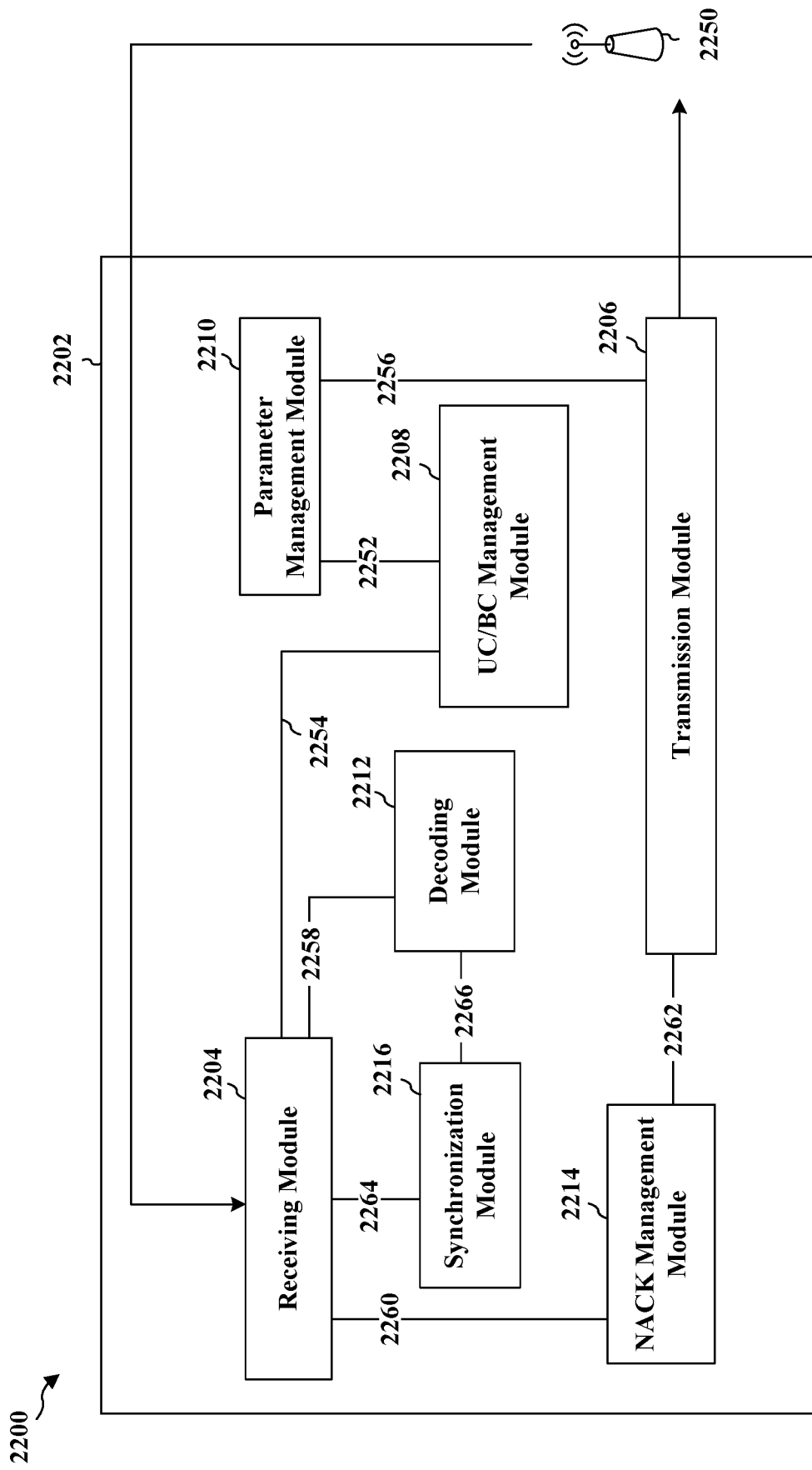
FIG. 22 is a conceptual data flow diagram illustrating the data flow between different modules/means/components in an exemplary apparatus.

FIG. 22 is a conceptual data flow diagram 2200 illustrating the data flow between different modules/means/components in an exemplary apparatus 2202. The apparatus 2202 may be a UE. The apparatus includes a receiving module 2204, a transmission module 2206, a UC/BC management module 2208, a parameter management module 2210, a decoding module 2212, a NACK management module 2214, and a synchronization module 2216.

According to a first approach, the UC/BC management module 2208 determines via the parameter management module 2210 through 2252 whether the apparatus 2202 is located within a sub-region of an MBSFN area based on one or more parameters. The UC/BC management module 2208 receives via the receiving module 2204 through 2254 based on the determination by the UC/BC management module 2208 a service over broadcast when the UE is located within the sub-region of the MBSFN area or over unicast when the UE is not located within the sub-region. In an aspect, the MBSFN area is smaller than a unicast area. In an aspect, the one or more parameters may include a characteristic associated with a broadcast service, a characteristic associated with a unicast service, a timing advance value, a location of the apparatus 2202, a path loss value, a parameter of the sub-region of the MBSFN area, a geometry, or any combination thereof.

In one aspect, when the apparatus 2202 initially receives the service over broadcast, the UC/BC management module 2208 may switch from reception of the service over broadcast to reception of the service over unicast based on the one or more parameters. In one aspect, when the apparatus 2202 initially receives the service over broadcast, the UC/BC management module 2208 may receive via the receiving module 2204 through 2254, from a base station 2250, one or more thresholds associated with the one or more parameters, and switch from receiving the service over broadcast to receiving the service over unicast based on the one or more thresholds and the one or more parameters through 2252. In one aspect, when the apparatus 2202 initially receives the service over broadcast, the UC/BC management module 2208 may receive via the receiving module 2204 through 2254 a handover command from a base station 2250, where the handover command is generated by the base station 2250 based on the one or more parameters, and switch from reception of the service over broadcast to reception of the service over unicast based on the handover command.

In one aspect, when the apparatus 2202 initially receives the service over unicast, the parameter management module 2210 may measure signal quality from the MBSFN area while receiving the service over unicast, and the UC/BC management module 2208 may switch from reception of the service over unicast to reception of the service over broadcast based on the measured signal quality through 2252. In one aspect, when the apparatus 2202 initially receives the service over unicast, the UC/BC management module 2208 may receive via the receiving module 2204 through 2254 one or more thresholds corresponding to the one or more parameters from a base station, and switch from reception of the service over unicast to reception of the service over broadcast based on the one or more thresholds and the one or more parameters through 2252. In one aspect, when the apparatus 2202 initially receives the service over unicast, the parameter management module 2210 performs a unicast measurement of the apparatus 2202, an MBSFN measurement, or any combination thereof, and transmits via the transmission module 2206 through 2256 the unicast measurement of the apparatus 2202, the MBSFN measurement, or any combination thereof, to the base station 2250. Subsequently, the UC/BC management module 2208 receives via the receiving module 2204 through 2254 a command from the base station 2250 to switch from reception of the service over unicast to reception of the service over broadcast based on the unicast measurement of the apparatus 2202, the MBSFN measurement, or any combination thereof, and switches from reception of the service over unicast to reception of the service over broadcast based on the command.

According to a second approach, the decoding module 2212 receives from the base station 2250 via the receiving module 2204 through 2258 a retransmission indicator, and receives from the base station 2250 via the receiving module 2204 through 2258 a broadcast retransmission of a signal corresponding to the retransmission indicator upon reception of the retransmission indicator. The decoding module 2212 combines the broadcast retransmission of the signal and an initial transmission of the signal previously received by the apparatus 2202 to decode the signal. In an aspect, the broadcast retransmission may be performed in the same MSP as the initial transmission of the signal or a different MSP from the initial transmission of the signal.

In an aspect, a NACK management module 2214 receives from the base station 2250 via the receiving module 2204 through 2260 information on a common NACK resource, and transmits a NACK via the common NACK resource through 2262, via the transmission module 2206, to the base station 2250 when the apparatus 2202 fails to decode the signal via the decoding module 2212. In an aspect, the common NACK resource is shared by a group of UEs including the apparatus 2202. In an aspect, the apparatus 2202 receives via the receiving module 2204 the at least one broadcast retransmission of the signal from the base station 2250 based on a determination by the MCE to retransmit the signal based on an energy metric of the transmitted NACK.

In an aspect, the information associated with the NACK resource is received at the apparatus 2202 via a SIB13, an MCCH, dedicated signaling, or any combination thereof. In an aspect, the broadcast retransmission of the signal is received in one or more packets of next MSP. In an aspect, the apparatus 2202 receives the retransmission indicator in an MSI before the broadcast retransmission to differentiate the initial transmission of the signal and the broadcast retransmission.

In an aspect, the NACK management module 2214 receives via the receiving module 2204 through 2260 information associated with a common NACK resource and a G-RNTI from the base station 2250. The NACK management module 2214 transmits a NACK via the common NACK resource through 2262, via the transmission module 2206, from the apparatus 2202 when the apparatus 2202 fails to decode the signal. In an aspect, the common NACK resource is shared by a group of UEs including the apparatus 2202. In an aspect, the apparatus 2202 receives via the receiving module 2204 the broadcast retransmission of the signal based on scheduling on the G-RNTI and the retransmission indicator.

In an aspect, the at least one broadcast retransmission is scheduled according to the G-RNTI if the base station 2250 determines to retransmit. In an aspect, the NACK resource and the G-RNTI are configured per cell or per group per cell. In an aspect, the information on the NACK resource is received at the apparatus 2202 via a SIB 13, an MCCH, dedicated signaling, or any combination thereof.

According to a third approach, the synchronization module 2216 receives via the receiving module 2204 through 2264 a serving cell MBMS signal from a serving cell of the apparatus 2202 and a neighbor cell MBMS signal from a neighbor cell, and determines a degree of synchronization between the serving cell MBMS signal and the neighbor cell MBMS signal. The decoding module 2212 combines the serving cell MBMS signal and the neighbor cell MBMS signal based on the degree of synchronization through 2266.

In an aspect, the synchronization module 2216 buffers a timing difference between the serving cell and the neighbor cell upon a determination that the degree of synchronization is greater than or equal to a threshold. In an aspect, the combining by the decoding module 2212 is based on the timing difference. In an aspect, the buffering the timing difference may include buffering one or more LLRs for the timing difference.

In an aspect, the synchronization module 2216 buffers a subframe as a whole upon a determination that the degree of synchronization is less than a threshold. In an aspect, the combining by the decoding module 2212 is based on the buffered subframe.

The apparatus may include additional modules that perform each of the steps of the algorithm in the aforementioned flow charts of FIGS. 12-14, 17, 18, and 21. As such, each step in the aforementioned flow charts of FIGS. 12-14, 17, 18, and 21 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 23:
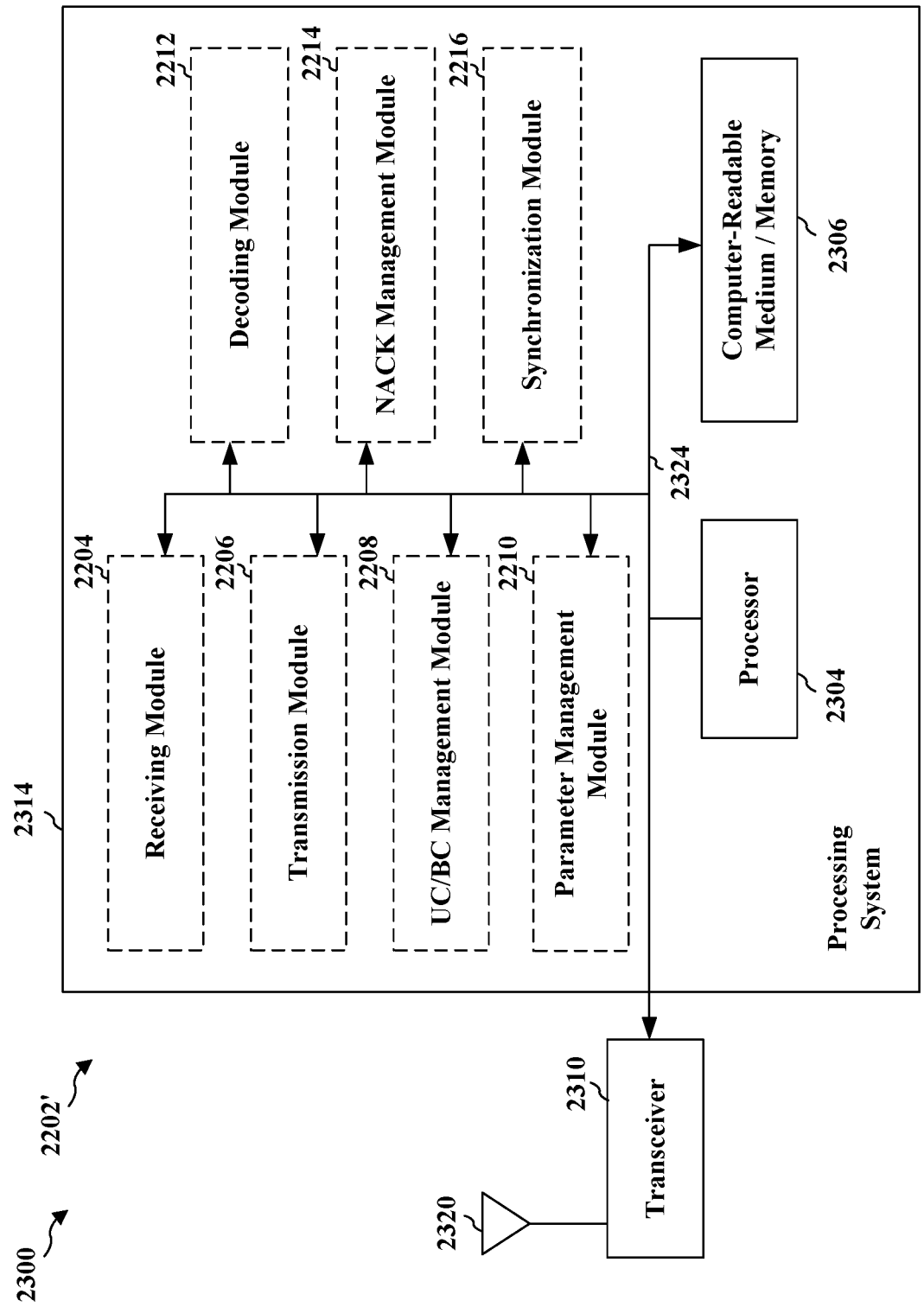
FIG. 23 is a diagram illustrating an example of a hardware implementation for an apparatus employing a processing system.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware modules, represented by the processor 2304, the modules 2204, 2206, 2208, 2210, 2212, 2214, 2216, and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the receiving module 2204. In addition, the transceiver 2310 receives information from the processing system 2314, specifically the transmission module 2206, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system further includes at least one of the modules 2204, 2206, 2208, 2210, 2212, 2214, 2216, or any combination thereof. The modules may be software modules running in the processor 2304, resident/stored in the computer readable medium/memory 2306, one or more hardware modules coupled to the processor 2304, or some combination thereof. The processing system 2314 may be a component of the UE 650 and may include the memory 660 and/or at least one of the TX processor 668, the RX processor 656, the controller/processor 659, or any combination thereof.

In one configuration, the apparatus 2202/2202' for wireless communication includes means for determining whether the apparatus 2202/2202' is located within a sub-region of an MBSFN area based on one or more parameters, and means for receiving, based on the determination, a service over broadcast when the apparatus 2202/2202' is located within the sub-region of the MBSFN area or over unicast when the apparatus 2202/2202' is not located within the sub-region. In an aspect, the MBSFN area is smaller than a unicast area. The apparatus 2202/2202' may be a UE.

In an aspect, the apparatus 2202/2202' receives the service over broadcast and the apparatus 2202/2202' further includes means for switching from reception of the service over broadcast to reception of the service over unicast based on the one or more parameters. In an aspect, the apparatus 2202/2202' further includes means for receiving, from a base station, one or more thresholds associated with the one or more parameters, and means for switching between reception of the service over broadcast and reception of the service over unicast based on the one or more thresholds and the one or more parameters. In an aspect, the apparatus 2202/2202' receives the service over broadcast and the apparatus 2202/2202' further includes means for receiving a handover command from a base station, where the handover command is generated by the base station based on the one or more parameters, and means for switching from reception of the service over broadcast to reception of the service over unicast based on the handover command.

In an aspect, the apparatus 2202/2202' receives the service over unicast and the apparatus 2202/2202' further includes means for measuring signal quality from the MBSFN area, and means for switching from reception of the service over unicast to reception of the service over broadcast based on the measured signal quality. In an aspect, the apparatus 2202/2202' receives the service over unicast and the apparatus 2202/2202' further includes means for performing a unicast measurement of the apparatus 2202/2202', an MBSFN measurement, or any combination thereof, means for transmitting the unicast measurement of the apparatus 2202/2202', the MBSFN measurement, or any combination thereof, to a base station, means for receiving a command from the base station to switch from reception the service over unicast to receiving the service over broadcast based on the transmission, and means for switching from reception of the service over unicast to reception of the service over broadcast based on the command.

In another configuration, the apparatus 2202/2202' for wireless communication includes means for receiving from a base station a retransmission indicator, means for receiving from the base station a broadcast retransmission of a signal corresponding to the retransmission indicator upon reception of the retransmission indicator, and means for combining the broadcast retransmission of the signal and an initial transmission of the signal previously received by the apparatus 2202/2202' to decode the signal. The apparatus 2202/2202' may be a UE. The apparatus 2202/2202' may further include means for receiving from the base station information associated with a common NACK resource, and means for transmitting a NACK via the common NACK resource to the base station when the apparatus 2202/2202' fails to decode the signal. In an aspect, the common NACK resource is shared by a group of UEs including the apparatus 2202/2202'. In an aspect, the apparatus 2202/2202' receives the broadcast retransmission of the signal from the base station based on a determination by the MCE to retransmit the signal based on an energy metric of the transmitted NACK. The apparatus 2202/2202' may further include means for receiving information associated with a common NACK resource and a G-RNTI from the base station, and means for transmitting a NACK via the common NACK resource from the apparatus 2202/2202' when the apparatus 2202/2202' fails to decode the signal. In an aspect, the common NACK resource is shared by a group of UEs including the apparatus 2202/2202'. In an aspect, the apparatus 2202/2202' receives the broadcast retransmission of the signal based on scheduling on the G-RNTI and the retransmission indicator.

In another configuration, the apparatus 2202/2202' for wireless communication includes means for receiving a serving cell MBMS signal from a serving cell of the apparatus 2202/2202' and a neighbor cell MBMS signal from a neighbor cell, means for determining a degree of synchronization between the serving cell MBMS signal and the at least one neighbor cell MBMS signal, and means for combining the serving cell MBMS signal and the at least one neighbor cell MBMS signal based on the degree of synchronization. The apparatus 2202/2202' may be a UE. The apparatus 2202/2202' may further include means for buffering a timing difference between the serving cell and the neighbor cell upon a determination that the degree of synchronization is greater than or equal to a threshold. In an aspect, the combining is based on the timing difference. The apparatus 2202/2202' may further include means for buffering a subframe as a whole upon a determination that the degree of synchronization is less than a threshold. In an aspect, the combining is based on the buffered subframe.

The aforementioned means may be one or more of the aforementioned modules of the apparatus 2202 and/or the processing system 2314 of the apparatus 2202' configured to perform the functions recited by the aforementioned means. As described supra, the processing system 2314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 24:
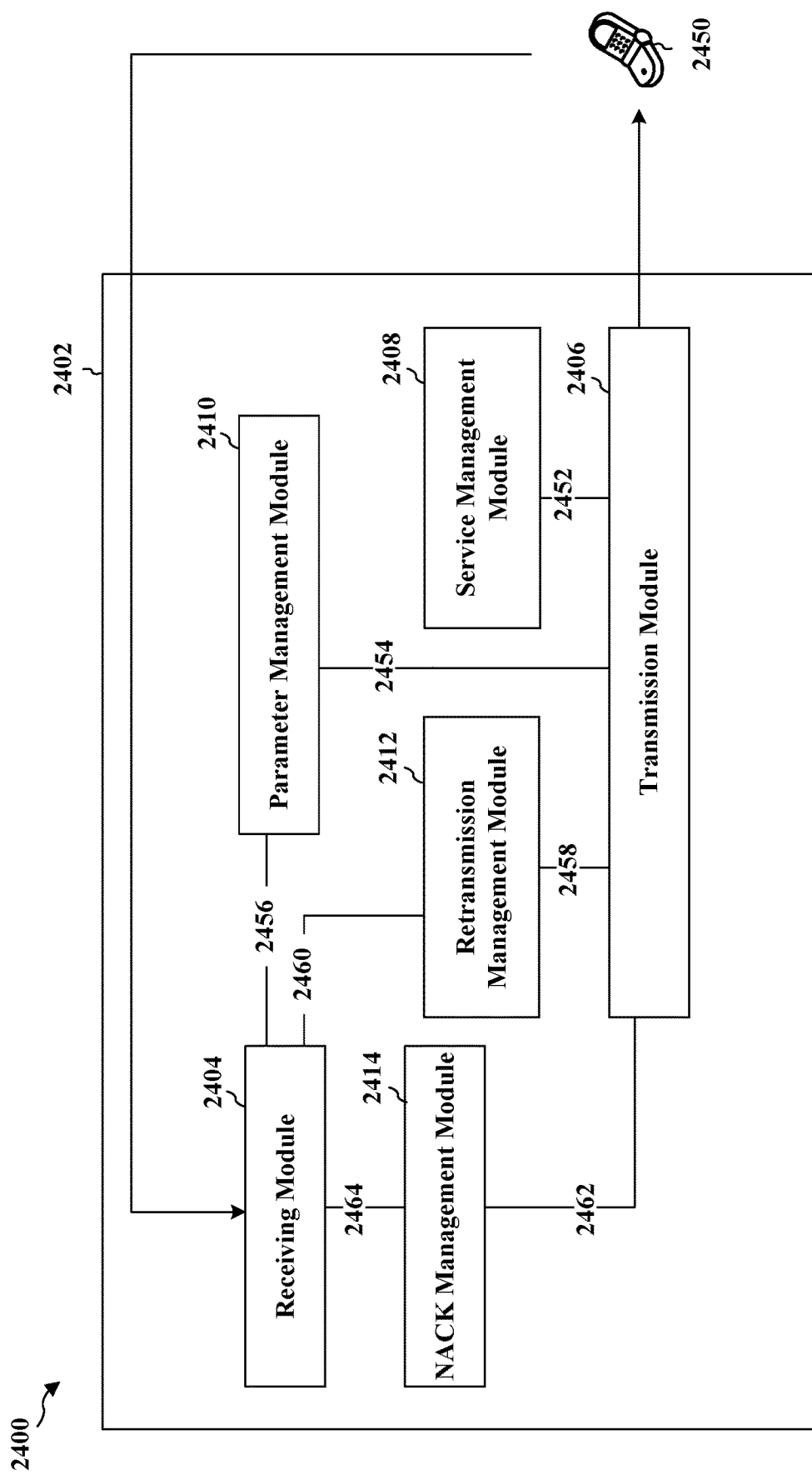
FIG. 24 is a conceptual data flow diagram illustrating the data flow between different modules/means/components in an exemplary apparatus.

FIG. 24 is a conceptual data flow diagram 2400 illustrating the data flow between different modules/means/components in an exemplary apparatus 2402. The apparatus 2402 may be an eNB. The apparatus includes a receiving module 2404, a transmission module 2406, a service management module 2408, a parameter management module 2410, a retransmission management module 2412, and a NACK management module 2414.

According to a first approach, the service management module 2408 provides via the transmission module 2406 through 2452 a service over broadcast to a UE 2450 in a sub-region of an MBSFN area, and the parameter management module 2410 sends via the transmission module 2416 through 2454 a signal associated with one or more parameters to the UE 2450, the signal causing the UE 2450 to switch from receiving the service over broadcast to receiving the service over unicast. In an aspect, the MBSFN area is smaller than a unicast area. In an aspect, the one or more parameters may include a characteristic associated with a broadcast service, a characteristic associated with a unicast service, a timing advance value, a location of the UE 2450, a path loss value, a parameter of the sub-region of the MBSFN area, and a geometry.

In an aspect, the signal includes one or more thresholds for the one or more parameters, the one or more thresholds for the one or more parameters causing the UE 2450 to switch from receiving the service over broadcast to receiving the service over unicast. In an aspect, the apparatus 2402 determines to send a handover command via the transmission module 2406 in the signal to the UE 2450 based on the one or more parameters, and the handover command causes the UE 2450 to switch from receiving the service over broadcast to receiving the service over unicast.

According to another aspect of the first approach, the service management module 2408 provides via the transmission module 2406 through 2452 a service over unicast to the UE 2450, and the parameter management module 2410 sends via the transmission module 2416 through 2454 a signal associated with one or more parameters to the UE, the signal causing the UE to switch from receiving the service over unicast to receiving the service over broadcast in a sub-region of a MBSFN area. In an aspect, the MBSFN area is smaller than a unicast area. In an aspect, the one or more parameters may include a characteristic associated with a broadcast service, a characteristic associated with a unicast service, a timing advance value, a location of the UE 2450, a path loss value, a parameter of the sub-region of the MBSFN area, and a geometry.

In an aspect, the signal includes one or more thresholds for the one or more parameters, the one or more thresholds for the one or more parameters causing the UE 2450 to switch from receiving the service over unicast to receiving the service over broadcast. In an aspect, the apparatus 2402 determines to send a command via the transmission module 2406 in the signal to the UE 2450 based on the one or more parameters, and the command causes the UE 2450 to switch from receiving the service over unicast to receiving the service over broadcast, the command being based on a unicast measurement of the UE 2450, an MBSFN measurement received via the receiving module 2404, or any combination thereof, through 2456.

According to a second approach, the transmission module 2406 sends an initial transmission of a signal the UE 2450. The retransmission management module 2412 sends via the transmission module 2406 through 2458 at least one retransmission indicator to the UE 2450, and sends via the transmission module 2406 through 2458 at least one broadcast retransmission of the signal respectively corresponding to the at least one retransmission indicator to the UE 2450 after sending the at least one retransmission indicator to facilitate decoding of the signal based on a combination of the at least one broadcast retransmission of the signal and the initial transmission of the signal.

In an aspect, the at least one broadcast retransmission may be performed using the same MSP as an MSP of the initial transmission of the signal or using a different MSP from the MSP of the initial transmission of the signal.

In an aspect, the apparatus 2402 is prompted by an MCE via the receiving module 2404 and the retransmission management module 2412 through 2460 to send the at least one broadcast retransmission of the signal to the UE 2450 one or more times based on signal quality of a single site MBSFN area and an MCS. In an aspect, the apparatus 2402 may be prompted to send the at least one broadcast retransmission of the signal when a SNR of the single site MBSFN area is less than or equal to an SNR threshold.

In an aspect, a NACK management module 2414 transmits via the transmission module 2406 through 2462 information on a common NACK resource to the UE 2450, and receives a NACK via the common NACK resource, via the receiving module 2404 through 2464, from the UE 2450 when the UE 2450 fails to decode the signal. In an aspect, the common NACK resource is shared by a group of UEs including the UE 2450, the group of UEs being served by one or more base stations including the apparatus 2402. In an aspect, the apparatus 2402 sends the at least one broadcast retransmission of the signal to the UE 2450 based on a determination by the MCE to retransmit the signal based on an energy metric of the NACK received at the one or more base stations including the apparatus 2402.

In an aspect, the information on the NACK resource is transmitted to the UE 2450 via a SIB13, a MCCH, dedicated signaling, or any combination thereof, via the transmission module 2406 through 2462. In an aspect, the at least one broadcast retransmission is sent in one or more packets of a next MSP. In an aspect, the apparatus 2402 transmits an indicator in an MSI before the at least one broadcast retransmission to the UE 2450 to differentiate an initial transmission and the at least one broadcast retransmission.

In an aspect, a NACK management module 2414 transmits via the transmission module 2406 through 2462 information on a common NACK resource and a G-RNTI to the UE 2450, and receives a NACK via the common NACK resource, via the receiving module 2404, from the UE 2450 when the UE 2450 fails to decode the signal. In an aspect, the common NACK resource is shared by a group of UEs including the UE 2450, the group of UEs being served by one or more base stations including the apparatus 2402. In an aspect, the apparatus 2402 sends the at least one broadcast retransmission of the signal to the UE 2450 based on an energy metric of the received NACK and scheduling on the G-RNTI.

In an aspect, the at least one broadcast retransmission is scheduled according to the G-RNTI if the apparatus 2402 determines to retransmit. In an aspect, the NACK resource and the G-RNTI are configured per cell or per group per cell. In an aspect, the information on the NACK resource is transmitted to the UE 2450 via a SIB 13, an MCCH, dedicated signaling, or any combination thereof.

The apparatus may include additional modules that perform each of the steps of the algorithm in the aforementioned flow charts of FIGS. 15, 16, 19, 20A, and 20B. As such, each step in the aforementioned flow charts of FIGS. 15, 16, 19, 20A, and 20B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 25:
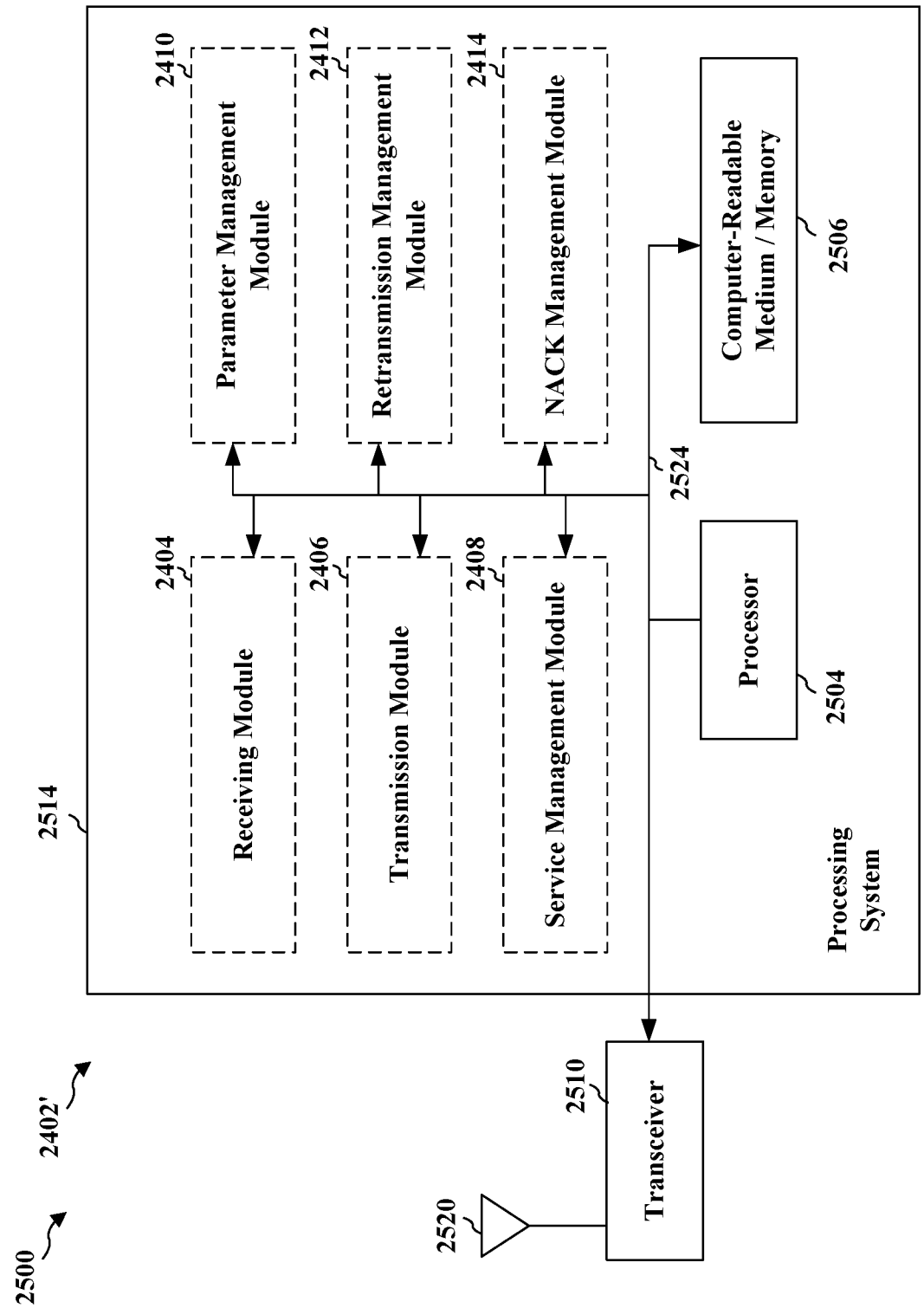
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware modules, represented by the processor 2504, the modules 2404, 2406, 2408, 2410, 2412, 2414, and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the receiving module 2404. In addition, the transceiver 2510 receives information from the processing system 2514, specifically the transmission module 2406, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system further includes at least one of the modules 2404, 2406, 2408, 2410, 2412, 2414, or any combination thereof. The modules may be software modules running in the processor 2504, resident/stored in the computer readable medium/memory 2506, one or more hardware modules coupled to the processor 2504, or some combination thereof. The processing system 2514 may be a component of the eNB 610 and may include the memory 676 and/or at least one of the TX processor 616, the RX processor 670, the controller/processor 675, or any combination thereof.

In one configuration, the apparatus 2402/2402' for wireless communication includes means for providing a service over broadcast to a UE in a sub-region of an MBSFN area, and means for sending a signal associated with one or more parameters to the UE, the signal causing the UE to switch from receiving the service over broadcast to receiving the service over unicast. In an aspect, the MBSFN area is smaller than a unicast area. The apparatus 2402/2402' may be a base station. In one configuration, the apparatus 2402/2402' for wireless communication includes means for providing a service over unicast to a UE, and means for sending a signal associated with one or more parameters to the UE, the signal causing the UE to switch from receiving the service over unicast to receiving the service over broadcast in a sub-region of an MBSFN area. In an aspect, the MBSFN area is smaller than a unicast area.

In one configuration, the apparatus 2402/2402' for wireless communication includes means for sending an initial transmission of a signal to a UE, means for sending at least one retransmission indicator to the UE, and means for sending at least one broadcast retransmission of the signal respectively corresponding to the at least one retransmission indicator to the UE after sending the at least one retransmission indicator to facilitate decoding of the signal based on a combination of the at least one broadcast retransmission of the signal and the initial transmission of the signal. The apparatus 2402/2402' may be a base station. The apparatus 2402/2402' may further include means for transmitting information on a common NACK resource to the UE, and means for receiving a NACK via the common NACK resource from the UE when the UE fails to decode the signal. In an aspect, the common NACK resource is shared by a group of UEs including the UE, the group of UEs being served by one or more base stations including the apparatus 2402/2402'. In an aspect, the apparatus 2402/2402' sends the at least one broadcast retransmission of the signal to the UE based on a determination by the MCE to retransmit the signal based on an energy metric of the NACK received at the one or more base stations including the apparatus 2402/2402'. The apparatus 2402/2402' may further include means for transmitting information on a common NACK resource and a G-RNTI to a UE, and means for receiving an NACK via the common NACK resource from the UE when the UE fails to decode the signal. In an aspect, the common NACK resource is shared by a group of UEs including the UE, the group of UEs being served by one or more base stations including the apparatus 2402/2402'. In an aspect, the apparatus 2402/2402' sends the at least one broadcast retransmission of the signal to the UE based on an energy metric of the received NACK and scheduling on the G-RNTI.

The aforementioned means may be one or more of the aforementioned modules of the apparatus 2402 and/or the processing system 2514 of the apparatus 2402' configured to perform the functions recited by the aforementioned means. As described supra, the processing system 2514 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "at least one of A, B, C, or any combination thereof" include any combination of A, B, and/or C, and may include multiples of A, multiples of B, or multiples of C. Specifically, combinations such as "at least one of A, B, or C," "at least one of A, B, and C," and "at least one of A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
    determining, by the UE, whether the UE is located within a sub-region of a multicast broadcast single-frequency network (MBSFN) area based on one or more parameters;
    receiving, by the UE, a service over broadcast based on a determination that the UE is located within the sub-region of the MBSFN area;
    receiving, by the UE, the service over unicast based on a determination that the UE is not located within the sub-region, wherein the MBSFN area is smaller than a unicast area;
    receiving, by the UE from a base station, a command to switch reception of the service over unicast to reception of the service over broadcast based on at least one of an MBSFN measurement by the UE or a unicast measurement by the UE when the UE receives the service over unicast; and
    switching, by the UE, reception of the service over unicast to reception of the service over broadcast based on the command.

2. The method of claim 1, wherein the one or more parameters comprise:
 a characteristic associated with a broadcast service,
 a characteristic associated with a unicast service,
 a timing advance value,
 a location of the UE,
 a path loss value,
 a parameter of the sub-region of the MBSFN area,
 a geometry, or a combination thereof.

3. The method of claim 1, wherein the UE receives the service over broadcast and the method further comprises:
 switching from reception of the service over broadcast to reception of the service over unicast based on the one or more parameters.

4. The method of claim 1, further comprising:
 receiving, from a base station, one or more thresholds associated with the one or more parameters; and
 switching between reception of the service over broadcast and reception of the service over unicast based on the one or more thresholds and the one or more parameters.

5. The method of claim 1, wherein the UE receives the service over broadcast the method further comprising:
 receiving a handover command from a base station, wherein the handover command is generated by the base station based on the one or parameters; and
 switching from reception of the service over broadcast to reception of the service over unicast based on the handover command.

6. The method of claim 1, wherein the MBSFN measurement by the UE comprises
 a signal quality from the MBSFN area.

7. The method of claim 1, wherein the UE receives the service over unicast and the method further comprises:
 performing the unicast measurement of the UE, the MBSFN measurement, or a combination thereof;
 transmitting the unicast measurement of the UE, the MBSFN measurement, or a combination thereof, to the base station.

8. A user equipment (UE) for wireless communication, comprising:
 a memory; and
 at least one processor coupled to the memory and configured to:
  determine whether the UE is located within a sub-region of a multicast broadcast single-frequency network (MBSFN) area based on one or more parameters;
  receive a service over broadcast based on a determination that the UE is located within the sub-region of the MBSFN area;
  receive the service over unicast based on a determination that the UE is not located within the sub-region, wherein the MBSFN area is smaller than a unicast area;
  receive, from a base station, a command to switch reception of the service over unicast to reception of the service over broadcast based on at least one of an MBSFN measurement by the UE or a unicast measurement by the UE when the UE receives the service over unicast; and
  switch reception of the service over unicast to reception of the service over broadcast based on the command.

9. The UE of claim 8, wherein the one or more parameters:
 a characteristic associated with a broadcast service,
 a characteristic associated with a unicast service,
 a timing advance value,
 a location of the UE,
 a path loss value,
 a parameter of the sub-region of the MBSFN area,
 a geometry, or a combination thereof.

10. The UE of claim 8, wherein the UE receives the service over broadcast and the at least one processor is further configured to:
 switch from reception of the service over broadcast to reception of the service over unicast based on the one or more parameters.

11. The UE of claim 8, wherein the at least one processor is further configured to:
 receive, from a base station, one or more thresholds associated with the one or more parameters; and
 switch between reception of the service over broadcast and reception of the service over unicast based on the one or more thresholds and the one or more parameters.

12. The UE of claim 8, wherein the UE receives the service over broadcast, the at least one processor being further configured to:
 receive a handover command from a base station, wherein the handover command is generated by the base station based on the one or more parameters; and
 switch from reception of the service over broadcast to reception of the service over unicast based on the handover command.

13. The UE of claim 8, wherein
 the MBSFN measurement by the UE comprises a signal quality from the MBSFN area.

14. The UE of claim 8, wherein the UE receives the service over unicast and the at least one processor is further configured to:
 perform the unicast measurement of the UE, the MBSFN measurement, or a combination there of;
 transmit the unicast measurement of the UE, the MBSFN measurement, or a combination thereof, to a base station.

15. A user equipment (UE) for wireless communication, comprising:
 means for determining whether the UE is located within a sub-region of a multicast broadcast single-frequency network (MBSFN) area based on one or more parameters;
 means for receiving a service over broadcast based on a determination that the UE is located within the sub-region of the MBSFN area;
 means for receiving the service over unicast based on a determination that the UE is not located within the sub-region, wherein the MBSFN area is smaller than a unicast area;
 means for receiving, from a base station, a command to switch reception of the service over unicast to reception of the service over broadcast based on at least one of an MBSFN measurement by the UE or a unicast measurement by the UE when the UE receives the service over unicast; and
 means for switching reception of the service over unicast to reception of the service over broadcast based on the command.

16. The UE of claim 15, wherein the one or more parameters comprise:
 a characteristic associated with a broadcast service,
 a characteristic associated with a unicast service,
 a timing advance value,
 a location of the UE,
 a path loss value, a parameter of the sub-region of the MBSFN area,
a geometry, or a combination thereof.

17. The UE of claim 15, wherein the UE receives the service over broadcast and the UE further comprises:
means for switching from reception of the service over broadcast to reception of the service over unicast based on the one or more parameters.

18. The UE of claim 15, further comprising:
means for receiving, from a base station, one or more thresholds associated with the one or more parameters; and
means for switching between reception of the service over broadcast and reception of the service over unicast based on the one or more thresholds and the one or more parameters.

19. The UE of claim 15, wherein the UE receives the service over broadcast, the UE further comprising:
means for receiving a handover command from a base station, wherein the handover command is generated by the base station based on the one or more parameters; and
means for switching from reception of the service over broadcast to reception of the service over unicast based on the handover command.

20. The UE of claim 15, wherein the MBSFN measurement by the UE comprises
a signal quality from the MBSFN area.

21. The UE of claim 15, wherein the UE receives the service over unicast and the UE further comprises:
means for performing the unicast measurement of the UE, the MBSFN measurement, or a combination thereof;
means for transmitting the unicast measurement of the UE, the MBSFN measurement, or a combination thereof, to a base station.

22. A non-transitory, computer-readable medium storing computer executable code for wireless communication at a user equipment (UE), comprising code to:
determine whether the UE is located within a sub-region of a multicast broadcast single-frequency network (MBSFN) area based on one or more parameters;
receive a service over broadcast based on a determination that the UE is located within the sub-region of the MBSFN area;
receive the service over unicast based on a determination that the UE is not located within the sub-region, wherein the MBSFN area is smaller than a unicast area;
receive, from a base station, a command to switch reception of the service over unicast to reception of the service over broadcast based on at least one of an MBSFN measurement by the UE or a unicast measurement by the UE when the UE receives the service over unicast; and
switch reception of the service over unicast to reception of the service over broadcast based on the command.

23. The computer-readable medium of claim 22, wherein the one or more parameters comprise:
a characteristic associated with a broadcast service,
a characteristic associated with a unicast service,
a timing advance value,
a location of the UE,
a path loss value,
a parameter of the sub-region of the MBSFN area,
a geometry, or a combination thereof.

24. The computer-readable medium of claim 22, wherein the UE receives the service over broadcast and the computer-readable medium further comprises code to:
switch from reception of the service over broadcast to reception of the service over unicast based on the one or more parameters.

25. The computer-readable medium of claim 22, further comprising code to:
receive, from a base station, one or more thresholds associated with the one or more parameters; and
switch between reception of the service over broadcast and reception of the service over unicast based on the one or more thresholds and the one or more parameters.

26. The computer-readable medium of claim 22, wherein the UE receives the service over broadcast, and the computer-readable medium further comprises code to:
receive a handover command from a base station, wherein the handover command is generated by the base station based on the one or more parameters; and
switch from reception of the service over broadcast to reception of the service over unicast based on the handover command.

27. The computer-readable medium of claim 22, wherein the MBSFN measurement by the UE comprises a signal quality from the MBSFN area.

28. The computer-readable medium of claim 22, wherein the UE receives the service over unicast and the computer-readable medium further comprises code to:
perform the unicast measurement of the UE, the MBSFN measurement, or a combination thereof;
transmit the unicast measurement of the UE, the MBSFN measurement, or a combination thereof, to a base station.

29. The method of claim 1, further comprising:
periodically measuring, after switching reception of the service from the MBSFN area to the unicast area, a signal quality associated with the MBSFN area when a bearer associated with the unicast is established.

30. The UE of claim 8, wherein the at least one processor is further configured to:
periodically measure, after switching reception of the service from the MBSFN area to the unicast area, a signal quality associated with the MBSFN area when a bearer associated with the unicast is established.

31. The UE of claim 15, further comprising:
means for periodically measuring, after switching reception of the service from the MBSFN area to the unicast area, a signal quality associated with the MBSFN area when a bearer associated with the unicast is established.

32. The computer-readable medium of claim 22, further comprising code to:
periodically measure, after switching reception of the service from the MBSFN area to the unicast area, a signal quality associated with the MBSFN area when a bearer associated with the unicast is established.

* * * * *